United States Patent

Peercy et al.

Patent Number: 5,880,736
Date of Patent: Mar. 9, 1999

[54] METHOD SYSTEM AND COMPUTER PROGRAM PRODUCT FOR SHADING

[75] Inventors: Mark Stuart Peercy, Sunnyvale; John Milligan Airey, Mountain View; Brian Keith Cabral, San Jose, all of Calif.

[73] Assignee: Silicon Graphics, Inc., Mountain View, Calif.

[21] Appl. No.: 879,657

[22] Filed: Jun. 20, 1997

Related U.S. Application Data

[63] Continuation-in-part of Ser. No. 810,218, Feb. 28, 1997.
[51] Int. Cl.$^6$ .................................................. G06F 15/00
[52] U.S. Cl. ............................................................ 345/426
[58] Field of Search ................................... 345/426, 427, 345/428, 429, 430, 117, 121

[56] References Cited

U.S. PATENT DOCUMENTS 5,230,039   7/1993   Grossman et al. ...................... 395/130

OTHER PUBLICATIONS

Akeley, K., "Reality Engine Graphics," *Computer Graphics (SIGGRAPH '93 Proceeedings)*, J.T., Kajuya, (Ed.), vol. 27, pp. 109–116 (Aug. 1993).

Barr, A. H., "Ray Tracing Deformed Surfaces," *Computer Graphics (SIGGRAPH '86 Proceedings)*, D. C. Evans and R. J. Athay, (Eds.), vol. 20, No. 4, pp. 287–296 (Aug. 1986).

Barr, A.H., "Global and Local Deformations of Solid Primitives," *Computer Graphics (SIGGRAPH '84 Proceedings)*, H. Christiansen, (Ed.), vol. 18, No. 3, pp. 21–30 (Jul. 1984).

Becker, B. G. and Max, N. L., "Smooth Transitions between Bump Rendering Algorithms," *Computer Graphics Proceedings*, Annual Conference Series, pp. 183–190 (1993).

(List continued on next page.)

*Primary Examiner*—Phu K. Nguyen
*Attorney, Agent, or Firm*—Sterne, Kessler, Goldstein & Fox P.L.L.C.

[57] ABSTRACT

A method, system, and computer program product are provided for accelerated shading of an object surface by bump mapping in tangent space or object space. A tangent space transform module builds a tangent space transform matrix M(p) having elements comprised of normal, tangent, and binormal vector components determined at a surface point on the object surface. The tangent space transform module further transforms shading vectors, such as, lighting and viewing vectors, into a tangent space defined by the tangent space transform matrix and outputs corresponding tangent space shading vectors. A bump mapping module performs vector operations between one or more tangent space shading vectors and a perturbed normal N' in tangent space. A texture memory stores a surface dependent or a surface independent tangent space perturbed normal texture map. The lighting module computes a shading value for the surface point based on the vector operations. The shading value can be then be mapped to a pixel to shade the object surface rendered on a computer graphics display. In one example, the bump mapping module outputs diffuse and specular components. The diffuse component corresponds to a first dot product between a normalized, interpolated tangent space lighting vector and three perturbed normal components Nx', Ny', and Nz'. The specular component corresponds to a second dot product between a normalized, interpolated tangent space half angle vector and three perturbed normal components Nx', Ny', and Nz'. Different types of shading vectors and lighting equations can be used depending upon the chosen illumination model. For bump mapping in object space, an object space transformation, such as the inverse of a modelview matrix, is used to define a transformation from eye space to object space for shading vectors. A bump mapping module performs a vector operation between an object space shading vector and a perturbed normal in object space to compute a shading value.

41 Claims, 13 Drawing Sheets

OTHER PUBLICATIONS

Bishop, G. and Weimer, D.M., "Fast Phong Shading," In *Computer Graphics (SIGGRAPH '86 Proceedings)*, D.C. Evans and R.J. Athay (Eds.), vol. 20, pp. 103–106 (Aug. 1986).

Blinn, J. F., "Simulation of Wrinkled Surfaces," *Computer Graphics (SIGGRAPH '78 Proceedings)*, vol. 12, No. 3, pp. 286–292 (Aug. 1978).

Blinn, J.F. and Newel, N.E., "Texture and Reflection in Computer Generated Images," *Communications of the ACM*, vol. 19, No. 10, pp. 542–547 (1976).

Catmull, E., "Computer Display of Curves Surfaces," *Proceedings of the IEEE Conference on Computer Graphics, Pattern Recognition, and Data Structure*, pp. 11–17 (May 1975).

Catmull, E., and Smith, A.R., "3–D Transformations of Images in Scanline Order," *Computer Graphics (SIGGRAPH '80 Proceedings)*, vol. 14, No. 3, pp. 279–285 (Jul. 1980).

Claussen, U., "Real Time Phong Shading," In *Fifth Eurographics Workshop on Graphics Hardware*, D. Grimsdale and A. Kaufman (Eds.), pp. 29–37 (1989).

Claussen, U., "On Reducing the Phong Shading Method," *Computer and Graphics*, vol. 14, No. 1, pp. 73–81 (1990).

Cohen, D. et al., "Real Time Discrete Shading," *The Visual Computer*, vol. 6, No. 1, pp. 16–27, (Feb. 1990).

Cook, R. L. et al., "The Reyes Image Rendering Architecture," *Computer Graphics (SIGGRAPH '87 Proceedings)*, M. C. Stone, (Ed.), vol. 21, No. 4, pp. 95–102 (Jul. 1987).

Cook, R.L. and Torrance, K.E., "A Reflectance Model for Computer Graphics," *Computer Graphics (SIGGRAPH '81 Proceedings)*, vol. 15, No. 3, pp. 307–316 (Aug. 1981).

Cook, R.L., "Shade Trees," *Computer Graphics (SIGGRAPH '84 Proceedings)*, H. Christiansen, (Ed.), vol. 18, No. 3, pp. 223–231 (Jul. 1984).

Cosman, M. A. & Grange, R. L., "CIG Scene Realism: The World Tomorrow", *Proceedings of I/ITSEC 1996 on CD–ROM*, (1996).

Cunningham, S., "3–D Viewing and Rotation Using Orthonormal Bases," *Graphics Gems I*, A.S. Glassner, (Ed.), Academic Press, pp. 516–521 (1990).

Deering, M. et al., "The Triangle Processor and Normal Vector Shader: A VLSI System for High Performance Graphics," In *Computer Graphics (SIGGRAPH '88 Proceedintgs)*, J. Dill (Ed.), vol. 22, No. 4, pp. 21–30 (Aug. 1988).

Dodson, C.T.J. and Poston, T., *Tensor Geometry*, Springer–Verlag, New York, Berlin, Heidelberg, pp. 43–48 and 170–212 (1990).

Drebin, R.A. et al., "Volume Rendering," *Computer Graphics (SIGGRAPH '88 Proceedings)*, J. Dill, (Ed.), vol. 22, No. 4, pp. 65–74 (Aug. 1988).

Dungan, Jr., W. et al., "Texture Title Considerations for Raster Graphics," *Computer Graphics (SIGGRAPH '78 Proceedings)*, vol. 12, No. 3, pp. 130–134 (Aug. 1978).

Foley et al., *Computer Graphics: Principles and Practice*, 2nd. Ed. in C (Addison–Wesley: New York, NY 1996), pp. 721–814 and 855–922.

Goss, M.E., "An Adjustable Gradient Filter for Volume Visualization Image Enhancement," *Proceedings of Graphics Interface '94*, (Banff, Alberta, Canada), Canadian Information Processing Society, pp. 67–74 (May 1994).

Gouraud, H., "Continuous Shading of Curved Surfaces," *IEEE Transactions on Computers*, vol. C–20, No. 6, pp. 623–629 (Jun. 1971).

Greene, N., "Applications of World Projections," *Proceedings of Graphics Interface '86*, M. Green, (Ed.), pp. 108–114 (May 1986).

Grimm, B. et al., "Modeling Surfaces of Arbitrary Topology Using Manifolds," *Proceedings of SIGGRAPH '95*, Annual Conference Series, R. Cook, (Ed.), ACM SIGGRAPH, ACM Press, pp. 359–368 (1995).

Guenter, B. et al., "Specializing Shaders," *Proceedings of SIGGRAPH '95*, Annual Conference Series, R. Cook, (Ed.), ACM SIGGRAPH, ACM Press, pp. 343–350 (Aug. 1995).

Haeberli, P.E. and Akeley, K., "The Accumulation Buffer: Hardware Support for High–Quality Rendering," *Computer Graphics (SIGGRAPH '90 Proceedings)*, F. Baskett, (Ed.), vol. 24, No. 4, pp. 309–318 (Aug. 1990).

Hanrahan, P. and Lawson, J., "A Language for Shading and Lighting Calculations," *Computer Graphics (SIGGRAPH '90 Proceedings)*, F. Baskett, (Ed.), vol. 24, No. 4, pp. 289–298 (Aug. 1990).

Hays, G.E., *Vector and Tensor Analysis*, Dover Publications, Inc., New York, NY, pp. 50–53 (1953).

Kajiya, J.T., "Anisotropic Reflection Models," *Computer Graphics (SIGGRAPH '85 Proceedings)*, B.A. Barsky, (Ed.), vol. 19, No. 3, pp. 15–21 (Jul. 1985).

Kuijk, A.A.M. and Blake, E.H., "Faster Phong Shading Via Angular Interpolation," *Computer Graphics Forum*, vol. 8, No. 4, pp. 315–324 (Dec. 1989).

Levoy, M., "Display of Surfaces From Volume Data," *IEEE Computer Graphics and Applications*, vol. 3 pp. 29–37 (May 1988).

Litwinoticz, P. and Miller, G., "Efficient Techniques for Interactive Texture Placement," (*Proceedings of SIGGRAPH '94*). Computer Graphics Proceedings, Annual Conference Series, A. Glassner, (Ed.), ACM SIGGRAPH, ACM Press, pp. 119–122 (Jul. 1994).

Maillott, J. et al., "Interactive Texture Mapping," *Computer Graphics (SIGGRAPH '93 Proceedings)*, Annual Conference Series, pp. 27–34 (Aug. 1993).

Max, N.L., "Horizon Mapping: shadows for bump–mapped surfaces," *The Visual Computer*, vol. 4, No. 2, pp. 109–117 (Jul. 1998).

Max, N. L. and Becker, B. G., "Bump Shading for Volume Textures," *IEEE Computer Graphics and Applications*, pp. 18–20 (Jul. 1994).

Mitchell, D.P. and Netravali, A.N., "Reconstruction Filters in Computer Graphics," *Computer Graphics (SIGGRAPH '88 Proceedings)*, J. Dill, (Ed.), vol. 22, No. 4, pp. 221–228 (Aug. 1988).

Neider et al., *OpenGL Programming Guide. The Official Guide to Learning OpenGL*, Release 1, Silicon Graphics Inc. (Addison–Wesley Publishing Co., USA), pp. 63–116 and 157–194 (1993).

Phong, B. T., "Illumination For Computer Generated Pictures," *Communications of the ACM*, vol. 18, No. 6, pp. 311–317 (Jun. 1975).

Porter, T. and Duff, T., "Compositing Digital Images," *Computer Graphics (SIGGRAPH '84 Proceedings)*, H. Christiansen, (Ed.), vol. 18, No. 3, pp. 253–259 (Jul. 1984).

Reynolds, R. A. et al., "Realistic Presentation of Three–Dimensional Medical Datasets," *Proceedings of Graphics Interface '88*, pp. 71–77 (Jun. 1988).

Schlag, J., "Fast Embossing Effects on Raster Image Data," *Graphics Gems IV*, P. S. Heckbert, (Ed.), Academic Press, Boston, MA, pp. 433–437 (1994).

Schutz, B., *Geometrical Methods of Mathematical Physics*, Cambridge University Press, The Pitt Building, Trumpington Street, Cambridge CB2 1RP, pp. 1–55, 94, 174–175 and 250 (1980).

Segal, J. et al., "Fast Shows and Lighting Effects Using Texture Mapping," *Computer Graphics (SIGGRAPH '92 Proceedings)*, E.E. Catmull, (Ed.), vol. 26, No. 2, pp. 249–252 (Jul. 1992).

Sims, K., "Artificial Evolution for Computer Graphics," *Computer Graphics (SIGGRAPH '91 Proceedings)*, T.W. Sederberg, (Ed.), vol. 25, No. 4, pp. 319–328 (Jul. 1991).

Torrance, K.E. and Sparrow, E.M., "Theory for Off–Specular Reflection From Roughened Surfaces," *Journal of Optical Society of America*, vol. 57, No. 9, pp. 1105–1114 (Sep. 1967).

Upstill, S., *The RenderMan Companion*, entire text (Addison–Wesley Publishing Co., USA) (1990).

Voorhies, D. and Foran, J., "Reflection Vector Shading Hardware," *Proceedings of SIGGRAPH '94*, Computer Graphics Proceedings, Annual Conference Series, A. Glassner, (Ed.), ACM SIGGRAPH, ACM Press, pp. 163–166 (Jul. 1994).

Watt, A. and Watt, M., *Advanced Animation and Rendering Techniques*, (Addison–Wesley: New York, NY), pp. 199–201 (1992).

Williams, L., "Shading in Two Dimensions," *Proceedings of Graphics Interface '91*, pp. 143–151 (Jun. 1991).

Ernst, I., et al., "Hardware Supported Bump Mapping: A Step Towards Higher Quality Real–Time Rendering," *10th Eurographics Workshop on Graphics Hardware*, pp. 63–70 (1995).

Glassner, A.S., *Principles of Digital Image Synthesis*, entire text, Morgan Kaufman Publishers, Inc., 340 Pine Street, Sixth Floor, San Francisco, California (1995).

Jain, A.K., *Fundamentals of Digital Image Processing*, entire text, Prentice–Hall, Englewood Cliffs, NJ (1989).

Pratt, W.K., *Digital Image Processing* (2nd Edition), entire text, John Wiley & Sons, Inc., New York, NY (1991).

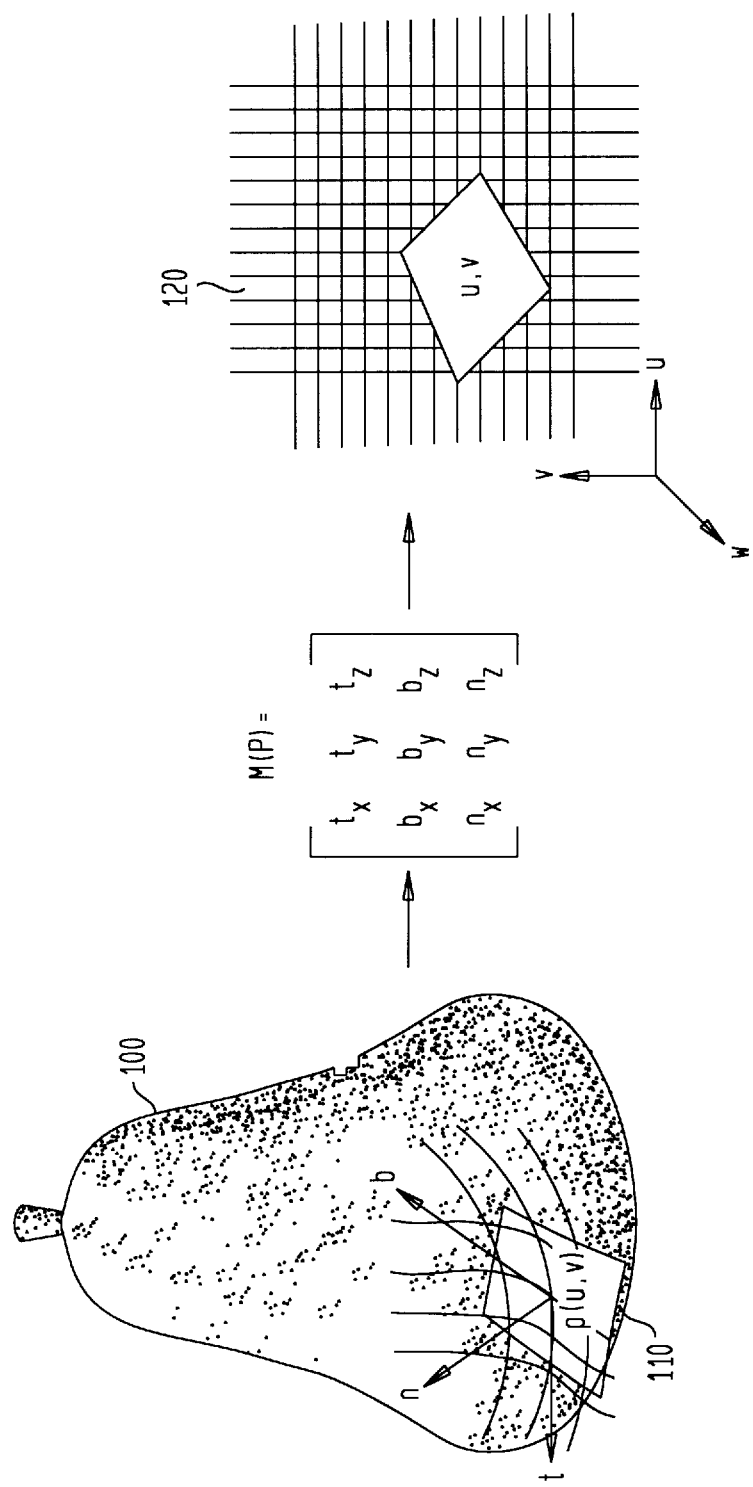

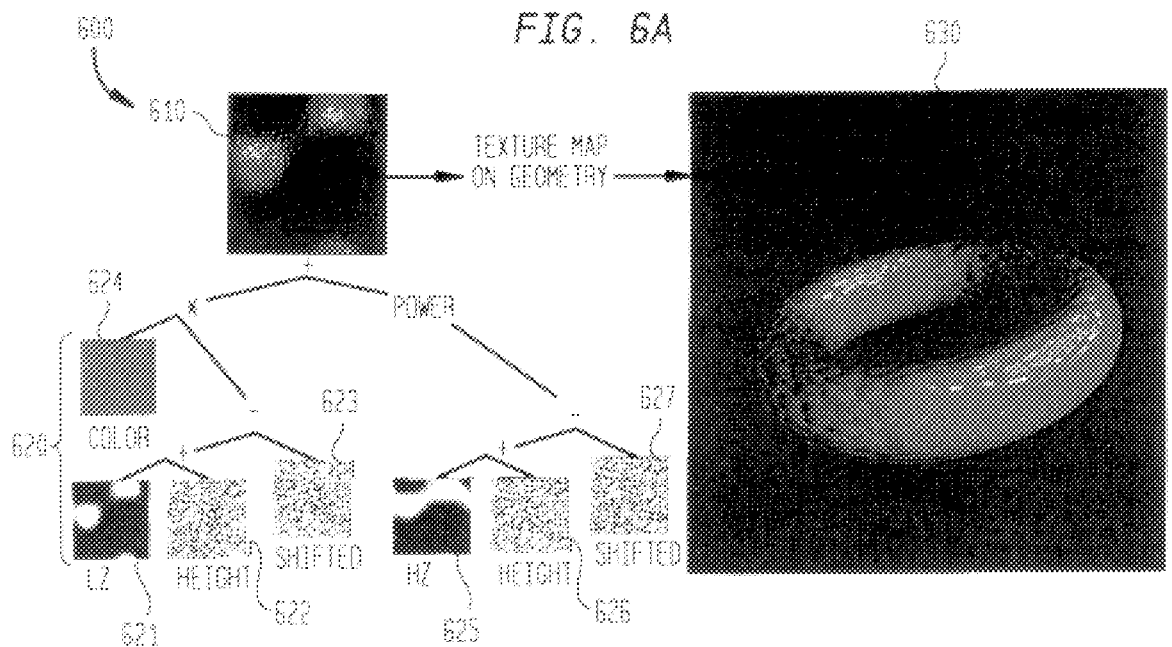
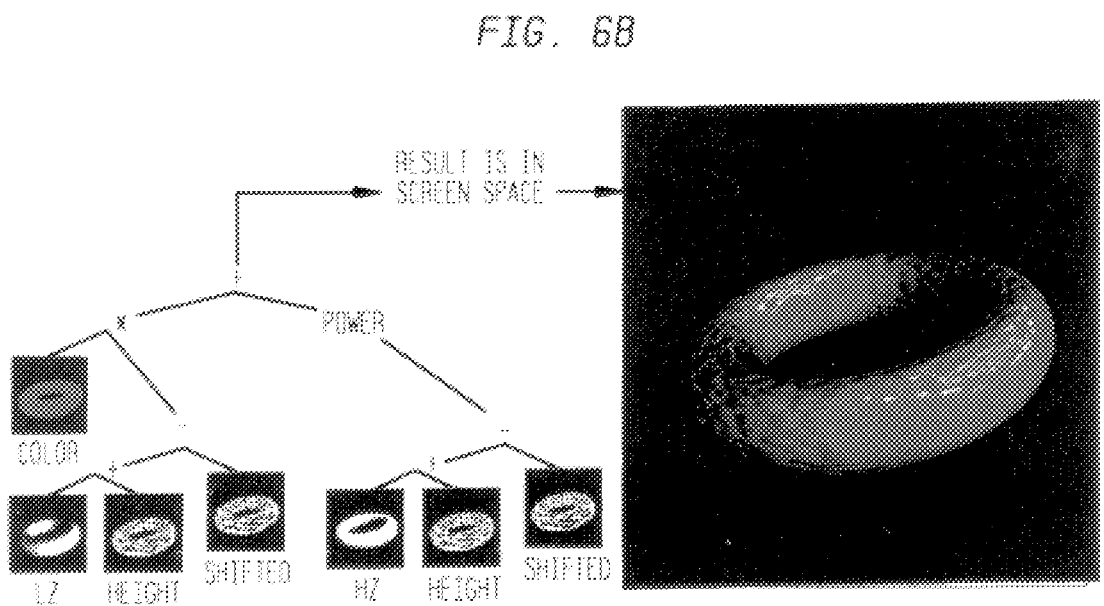

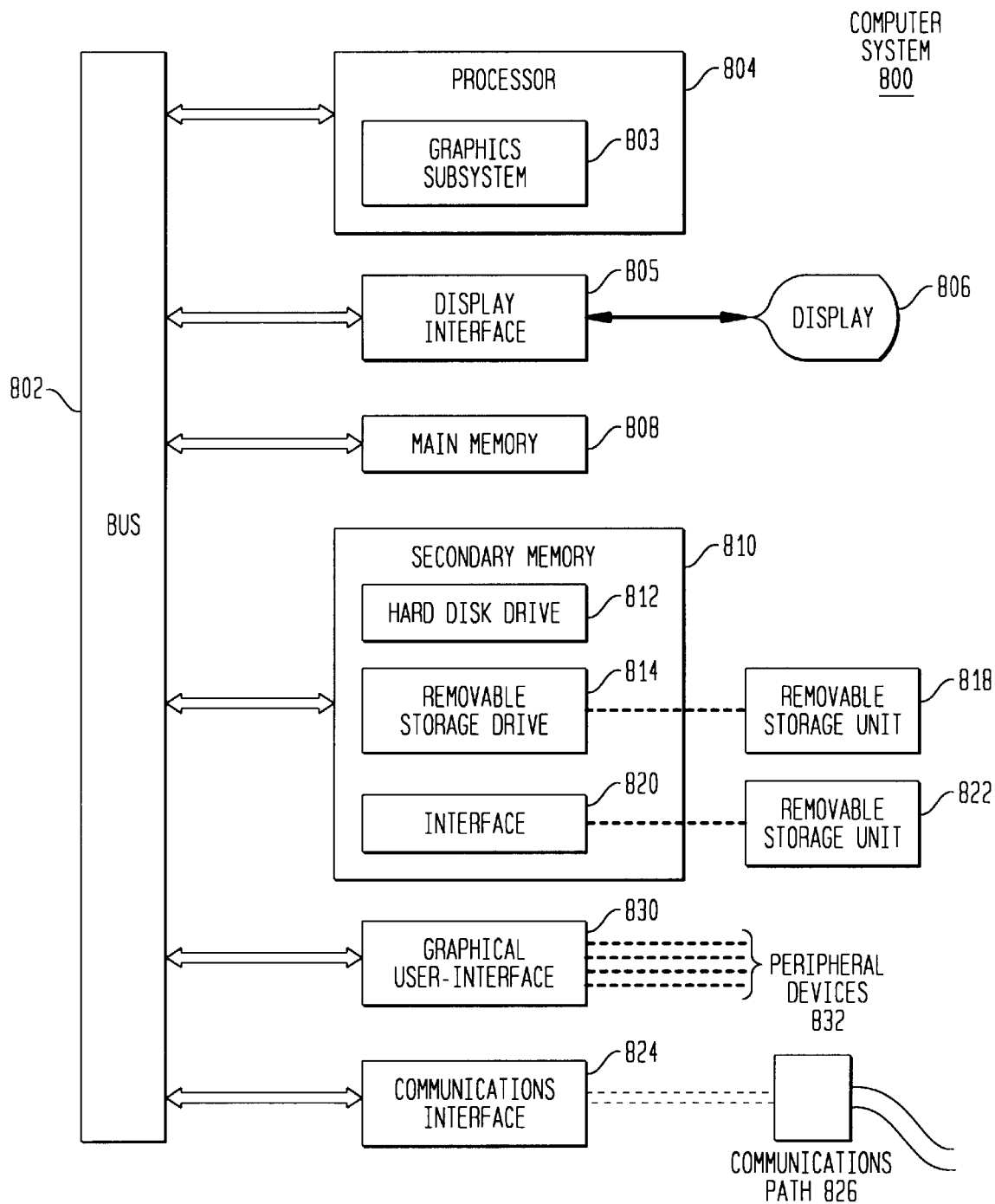

METHOD SYSTEM AND COMPUTER PROGRAM PRODUCT FOR SHADING

CROSS REFERENCE TO RELATED APPLICATION

This Application is a continuation-in-part of application Ser. No. 08/810,218, filed Feb. 28, 1997, entitled "Method, System, and Computer Program Product for Bump Mapping in Tangent Space," by Cabral et al. (Atty. Docket No. 15-4-394.00), now pending.

BACKGROUND OF THE INVENTION

1. Field of the Invention

The present invention relates generally to shading computer-generated images.

2. Related Art

Shading calculations in commercially available graphics systems have been limited to lighting at the vertices of a set of polygons, with the resultant colors interpolated and composited with a texture. The drawbacks of Gouraud interpolation are well known and include diffused, crawling highlights and Mach banding. See, Gouraud, H., "Computer Display of Curved Surfaces", *IEEE Trans. Computers C-20* 6:623–629 (1971). The use of this method is motivated primarily by the relatively large cost of the lighting computation. When done at the vertices, this cost is amortized over the interiors of polygons.

The division of a shading computation into per-vertex and per-pixel components is a general strategy in hardware graphics acceleration. See, Akeley, K., "RealityEngine Graphics", *Computer Graphics (SIGGRAPH '93 Proceedings)* vol. 27, J. T., Kajuya, (ed), (August 1993), pp. 109–116. Commonly, the vertex computations are performed in a general floating point processor or central processing unit (CPU), while the per-pixel computations are in special purpose, fixed point hardware. The division is a function of cost versus the general applicability, in terms of quality and speed, of a feature. Naturally, the advance of processor and application-specific integrated circuit technology has an impact on the choice.

Because the per-vertex computations are done in a general processor, the cost of a new feature tends to be dominated by additional per-pixel hardware. If this feature has a very specific application, the extra hardware is hard to justify because it lays idle in applications that do not leverage it. In low-end graphics or game systems, where every transistor counts, additional rasterization hardware is particularly expensive.

Shading quality can be increased dramatically with Phong shading, which interpolates and normalizes vertex normal vectors at each pixel. See, Phong, B.-T., "Illumination For Computer Generated Pictures", *Communications of the ACM* 18 6:311–317 (June 1975). Light and halfangle vectors are computed directly in world space or interpolated, either of which requires their normalization for a local viewer and light. FIG. 11A shows rasterization hardware for one example implementation of Phong shading. Phong shading adds significant cost to rasterization hardware. However, higher quality lighting is almost universally desired in three-dimensional graphics applications, and advancing semiconductor technology is making Phong shading hardware more practical.

Bump mapping is a technique used in advanced shading applications for simulating the effect of light reflecting from small perturbations across a surface. See, Blinn, J. F., "Simulation of Wrinkled Surfaces", *Computer Graphics (SIGGRAPH '78 Proceedings)* vol. 12, (August 1978), pp. 286–292. A single component texture map, $f(u, v)$, is interpreted as a height field that perturbs the surface along its normal vector, $N=(P_u \times P_v)/|(P_u \times P_v)|$, at each point. Rather than actually changing the surface geometry, however, only the normal vector is modified. From the partial derivatives of the surface position in the u and v parametric directions ($P_u$ and $P_v$) and the partial derivatives of the image height field in u and v ($f_u$ and $f_v$) a perturbed normal vector N' is given by:

$$N'=((P_u \times P_v)+D)/|(P_u \times P_v)+D| \qquad (1)$$

where, a displacement vector D becomes:

$$D=-f_u(P_v \times N)-f_v(N \times P_u) \qquad (2)$$

In these equations, $P_u$ and $P_v$ are not normalized. This causes the bump heights to be a function of the surface scale because $P_u \times P_v$ changes at a different rate than D. If the surface scale is doubled, the bump heights are halved. This dependence on the surface often is an undesirable feature and a constant bump height is forced instead. See, Blinn, J. F., "Simulation of Wrinkled Surfaces", *Computer Graphics (SIGGRAPH '78 Proceedings)*, vol. 12, (August 1978), pp. 286–292.

A full implementation of these equations in a rasterizer can be impractical, so the computation is divided among a preprocessing step, per-vertex, and per-pixel calculations. An expensive method to implement bump mapping in hardware, and one that is planned for a high-end graphics workstation, is to compute $P_u \times P_v$, $P_v \times N$, and $N \times P_u$ at polygon vertices and interpolate them to polygon interiors. See, Cosman, M. A. & Grange, R. L., "CIG Scene Realism: The World Tomorrow", *Proceedings of I/ITSEC 1996 on CD-ROM*, (1996), p. 628. The perturbed normal vector is computed and normalized as in Equation 1, with $f_u$ and $f_v$ read from a texture map. The resulting normal vector is used in an illumination model.

The hardware for this method of Cosman and Grange is shown in FIG. 11B. Because $P_u$ and $P_v$ are unbounded, the three interpolators and the vector addition, vector scaling, and normalization units must have much greater range and precision than those needed for bounded vectors. One approximation to this expensive implementation has been proposed, where $P_v \times N$ and $N \times P_u$ are held constant across a polygon. See, Ernst, I., et al., "Hardware Supported Bump Mapping: A Step Towards Higher Quality Real-Time Rendering", *10th Eurographics Workshop on Graphics Hardware* (1995), pp. 63–70. This approximation is known to have artifacts.

SUMMARY OF THE INVENTION

As the inventors discovered, what is needed is an implementation of bump mapping that leverages Phong shading hardware at full speed, eliminating either a large investment in special purpose hardware or a slowdown during bump mapping.

The present invention provides a method, system, and computer program product for accelerated bump mapping shading of objects in a computer-generated image. A tangent space transform is defined and used to accelerate bump mapping shading. The tangent space transform according to the present invention converts the three-dimensional shading problem of fine detailed lighting into a two-dimensional problem. In this way, two-dimensional image processing operations can be used to compute shading.

Fast, two-dimensional image processing hardware can then be designed easily—naturally accelerating computer graphics rendering. To accelerate shading even further, two-dimensional lighting (shading) calculations can be calculated at multiple resolutions.

According to the present invention, high-quality, accelerated shading is provided by bump mapping in tangent space. A method, system, and computer program product are provided for shading an object surface using a tangent space transform and bump mapping. One system embodiment includes a tangent space transform module, a bump mapping module, and a lighting module. The tangent space transform module builds a tangent space transform matrix having elements comprised of normal, tangent, and binormal vector components determined at a surface point on the object surface. The tangent space transform module further transforms a shading vector at the surface point into a tangent space defined by the tangent space transform matrix and outputs a corresponding tangent space shading vector.

The bump mapping module performs a vector operation between the tangent space shading vector and a perturbed normal in tangent space at the surface point. For example, the vector operation performed can calculate a dot product, sum, cross product, or other arithmetic operation between the tangent space shading vector and a perturbed normal in tangent space at the surface point. The lighting module computes a shading value for the surface point based on the dot product. The shading value can then be mapped to a pixel to shade the object surface rendered on a computer graphics display.

A memory stores a perturbed normal texture map. The perturbed normal texture map has texels defined by three perturbed normal components Nx', Ny', and Nz', representing or approximating in tangent space the differential surface behavior of the object surface when perturbed by a height field f(u,v). The perturbed normal texture map can be surface dependent or surface independent. The perturbed normal texture map (surface dependent or surface independent) can be computed during pre-processing prior to rendering a computer graphics image, or "on-the-fly" during rendering of the computer graphics image.

In one embodiment, a surface dependent texture map N' has three perturbed normal components Nx', Ny', and Nz' for a tangent space perturbed normal according to the following equations:

$$N'_{TS} = (N'x, N'y, N'z) = \frac{(a,b,c)}{\sqrt{a^2 + b^2 + c^2}} \ ;$$

where coefficients a, b, c are given by:

$$a = -f_u(B \cdot P_v)$$

$$b = -(f_v|P_u| - f_u(T \cdot P_v))$$

$$c = |P_u \times P_v|$$

In another embodiment, a surface independent texture map N' has three perturbed normal components $N_x'$, $N_y'$, and $N_z'$ which approximate a tangent space perturbed normal according to the following equations:

$$N'_{TS} = (N'x, N'y, N'z) = \frac{(a,b,c)}{\sqrt{a^2 + b^2 + c^2}} \ ;$$

where coefficients a, b, c are given by:

$$a = -kf_u$$

$$b = -kf_v$$

$$c = k^2$$

Any type of shading vector can be transformed to tangent space including, but not limited to, a lighting vector, a viewing vector, a half angle vector, and a reflection vector.

In one preferred embodiment, for each vertex of a polygon (e.g., a triangle) to be rasterized, the tangent space transform module transforms a lighting vector and a viewing vector into a tangent space defined by the tangent space transform matrix to form corresponding tangent space lighting and viewing vectors. Once the triangle is rasterized to form pixels, the bump mapping module interpolates and normalizes the tangent space lighting and viewing vectors across one or more corresponding polygons (e.g., triangles) for each pixel. The bump mapping module computes a tangent space half angle vector based on the normalized, interpolated tangent space lighting and viewing vectors. For example, the tangent space half angle vector can be a sum or other combination of the tangent space lighting and viewing vectors. The tangent space half angle is then interpolated and normalized across at least one corresponding polygon (e.g., triangle).

The bump mapping module then performs a vector operation for each pixel. In one example, a first dot product is calculated between the normalized tangent space lighting vector and the perturbed normal in tangent space for each pixel. A second dot product is calculated between the normalized tangent space half angle vector and the perturbed normal in tangent space. The first and second dot products represent diffuse and specular components respectively. A lighting module computes a shading value based on the diffuse and specular components according to a desired lighting equation. Different types of lighting equations are used depending upon the chosen illumination model.

Another embodiment creates a new diffuse bump mapped texture for every change in the lighting or viewing position. Multiple rendering passes are made to create a lit image that represents a new tangent space bump mapped texture. The lit image is based on at least one of a diffuse image and a specular image. The diffuse image is generated from a combination of images including a tangent space $Lz_{TS}$ image, a height image, a z component diffuse image, and a shifted image. The specular image is generated from a combination of images including a tangent space $Hz_{TS}$ image, a height image, a z component specular image, and a shifted image.

The inventors express bump map shading predominantly as a function of the bump map slope in the direction of the light source and viewer. A per-pixel bump map lighting computation is then realized which is a linear function of the per-vertex lighting geometry. By moving bump mapping shading calculations to a tangent space defined by matrix M(p), expensive three-dimensional calculations are avoided. In this way, the number of per-pixel bump mapping calculations are reduced compared to conventional bump mapping shading techniques while still capturing salient visual effects of bump mapping.

The present invention provides an implementation of bump mapping that, by transforming shading vectors into tangent space, avoids any significant new rasterization hardware beyond current Phong shading hardware. According to the present invention, Phong shading hardware can be leveraged at full speed, eliminating either a large investment in special purpose bump mapping hardware or a slowdown during bump mapping. As Phong shading becomes a standard addition to hardware graphics systems because of its general applicability, the present invention can be used to extend Phong shading in such an effective manner that it is natural to support bump mapping even in the lowest cost Phong shading systems.

In another embodiment of the present invention, high-quality, accelerated shading is provided by bump mapping in object space. A method, system, and computer program product are provided for shading an object surface using an object space transform and bump mapping. One system embodiment includes an object space transform module, a bump mapping module, and a lighting module. The object space transform module builds an object space transform that defines a transformation from eye space to object space.

In one example, the object space transform module calculates an inverse of a modelview matrix where the modelview matrix defines a transformation from object space to eye space. The object space transform module further transforms a shading vector defined at a surface point in eye space into an object space defined by the object space transform matrix and outputs a corresponding object space shading vector.

The bump mapping module performs a vector operation between the object space shading vector and a perturbed normal in object space at the surface point. For example, the vector operation performed can calculate a dot product, sum, cross product, or other arithmetic operation between the object space shading vector and a perturbed normal in object space at the surface point. The lighting module computes a shading value for the surface point based on the dot product. The shading value can then be mapped to a pixel to shade the object surface rendered on a computer graphics display.

A memory stores an object space perturbed normal texture map. The object space perturbed normal texture map has texels defined by three perturbed normal components representing or approximating in object space the differential surface behavior of the object surface when perturbed by a height field f(u,v). In one example, three perturbed normal components, $Nx'_{OS}$, $Ny'_{OS}$, and $Nz'_{OS}$, of a surface dependent, perturbed normal object space texture map $N'_{OS}$ are calculated from an object space perturbed normal $N'_{OS}$ defined by the following equation:

$$N'_{OS} = ((P_u \times P_v) + D_{OS}) / |(P_u \times P_v) + D_{OS}|$$

where, $P_u$ and $P_v$ are partial derivatives in object space of the surface position in the u and v parametric directions and a displacement vector $D_{OS}$ in object space is given by:

$$D_{OS} = -f_u = (P_v \times N) - f_v (N \times P_u)$$

where, $f_u$ and $f_v$ are partial derivatives of the image height field in u and v and N is the unperturbed normal vector in object space. A surface dependent, object space perturbed normal texture map can be computed during pre-processing prior to rendering a computer graphics image, or "on-the-fly" during rendering of the computer graphics image.

Any type of shading vector can be transformed to object space including, but not limited to, a lighting vector, a viewing vector, a half angle vector, and a reflection vector.

In one preferred embodiment, for each vertex of a polygon (e.g., a triangle) to be rasterized, the object space transform module transforms a lighting vector and a viewing vector into an object space defined by the object space transform matrix to form corresponding object space lighting and viewing vectors. Once the triangle is rasterized to form pixels, the bump mapping module interpolates and normalizes the object space lighting and viewing vectors across one or more corresponding polygons (e.g., triangles) for each pixel. The bump mapping module computes an object space half angle vector based on the normalized, interpolated object space lighting and viewing vectors. For example, the object space half angle vector can be a sum or other combination of the object space lighting and viewing vectors. The object space half angle is then interpolated and normalized across at least one corresponding polygon (e.g., triangle).

The bump mapping module then performs a vector operation for each pixel. In one example, a first dot product is calculated between the normalized object space lighting vector and the perturbed normal in object space for each pixel. A second dot product is calculated between the normalized object space half angle vector and the perturbed normal in object space. The first and second dot products represent diffuse and specular components respectively. A lighting module computes a shading value based on the diffuse and specular components according to a desired lighting equation. Different types of lighting equations are used depending upon the chosen illumination model.

The present invention provides an implementation of bump mapping that, by transforming shading vectors into object space, avoids any significant new rasterization hardware beyond current Phong shading hardware. According to the present invention, Phong shading hardware can be leveraged at full speed, eliminating either a large investment in special purpose bump mapping hardware or a slowdown during bump mapping. As Phong shading becomes a standard addition to hardware graphics systems because of its general applicability, the present invention can be used to extend Phong shading in such an effective manner that it is natural to support bump mapping even in the lowest cost Phong shading systems.

The present invention is not limited to bump mapping shading in object space or tangent space. The present invention can be used to shade a computer graphics image by performing a lighting calculation where all lighting vectors are transformed into the same coordinate space as a normal vector (or in the same coordinate space as a perturbed normal vector in the case of bump mapping shading).

According to another embodiment of the present invention, a method, system, and computer program product for shading a computer graphics image are provided. A normal vector defined in terms of a coordinate space is fetched from memory. One or more shading vectors used in shading are transformed into the same coordinate space as the normal vector. A lighting computation is performed in the coordinate space using the normal vector and the transformed shading vector to shade the object surface.

In the special case of bump mapping shading, a perturbed normal vector for the object surface is fetched from memory, the perturbed normal vector being defined in terms of a coordinate space. One or more shading vectors used in shading are transformed into the same coordinate space as the perturbed normal vector. A lighting computation is performed in the coordinate space using the perturbed normal vector and the transformed shading vector to shade the object surface.

Further features and advantages of the present invention, as well as the structure and operation of various embodiments of the present invention, are described in detail below with reference to the accompanying drawings.

BRIEF DESCRIPTION OF THE DRAWINGS

The file of this patent application contains at least one drawing executed in color. Copies of this patent with color drawing(s) will be provided by the Patent and Trademark Office upon request and payment of the necessary fee.

The accompanying drawings, which are incorporated herein and form part of the specification, illustrate the present invention and, together with the description, further serve to explain the principles of the invention and to enable a person skilled in the pertinent art to make and use the invention.

FIG. 1 is a pictorial representation of an example tangent space transform operation used to provide high-quality, accelerated shading for a pear-shaped, textured object, according to the present invention.

FIGS. 6A and 6B show an example shade tree representation of bump mapping in tangent space according to a multiple rendering passes embodiment of the present invention.

FIG. 8 shows an example computer system including the graphics subsystem of FIG. 3.

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE EMBODIMENTS

Table of Contents

Figure 2A:
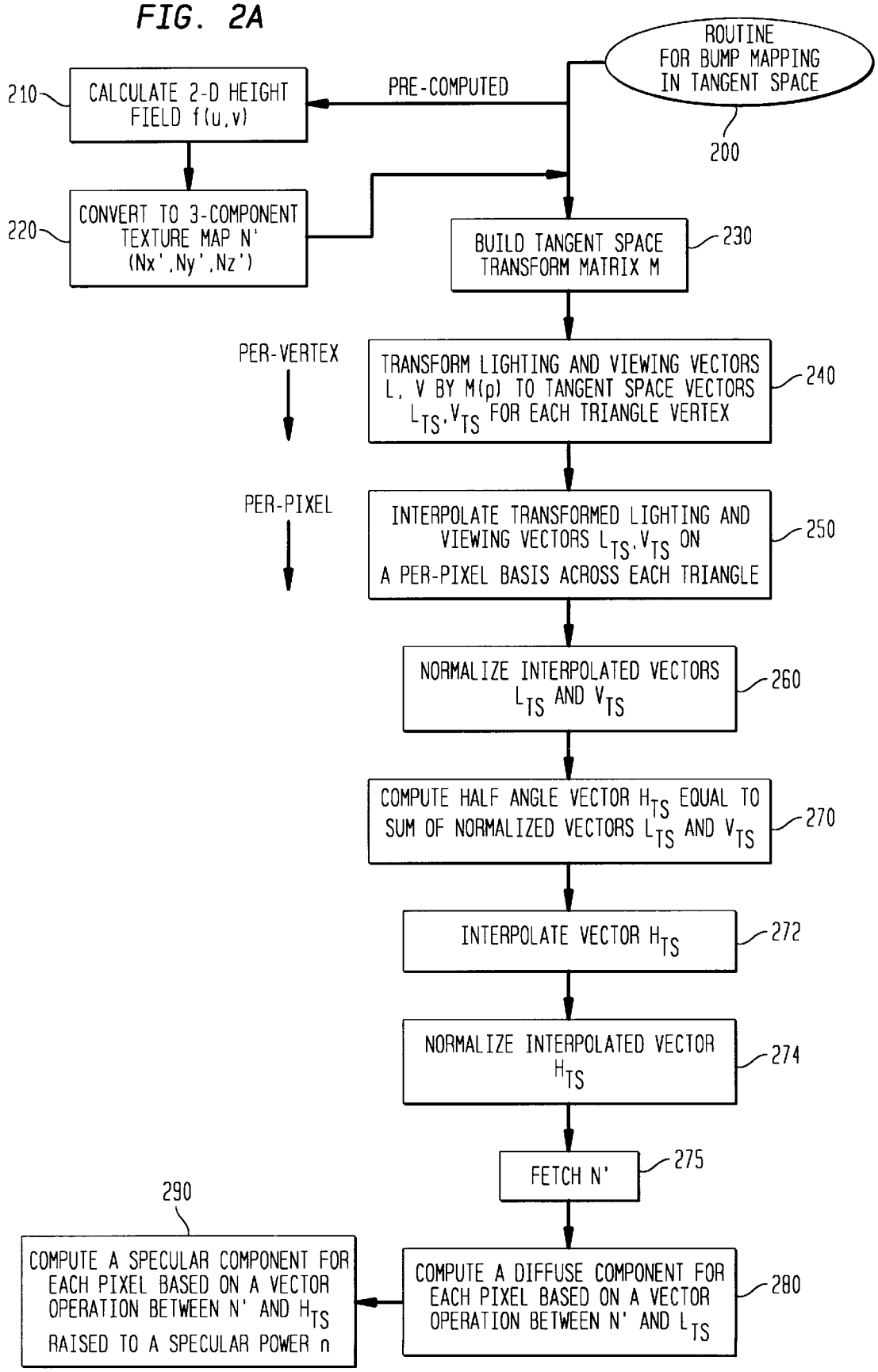
FIG. 2A is a flowchart of a routine for bump mapping in tangent space according to one embodiment of the present invention.

1. Overview and Discussion of the Invention
2. Terminology
3. Example Environment
4. Tangent Space Transform
5. Tangent Space Transform for Bump Mapping
   a. Surface Dependent Texture Map
   b. Surface Independent Texture Map
   c. Examples
6. Multiple Rendering Passes
7. Example GUI Computer Environment
8. Object Space Transform
9. Conclusion 1. Overview and Discussion of the Invention According to the present invention, a tangent space transform is used to transform normal, tangent, and binormal vectors from eye space to tangent space. In tangent space, the normal, tangent, and binormal vectors are constant and do not have to be interpolated. A perturbed normal vector N' used in bump mapping is also constant over tangent space. Further, the perturbed normal N' can be computed from a two-component height field f(u,v) and stored as a three-component perturbed normal texture map during pre-processing or "on-the-fly." The perturbed normal texture map can be surface dependent or surface independent.

Shading vectors used in a bump mapping shading model are transformed to tangent space. For greatest shading quality, the shading vectors are transformed on a per-pixel basis. To reduce computation costs, a linear approximation is used to transform shading vectors to tangent space at every pixel. In this approximation, shading vectors are transformed to tangent space at each vertex and then interpolated on a per-pixel basis. Bump mapping and lighting processing then proceeds using the three-component, perturbed normal N' texture map and the transformed, interpolated tangent space shading vectors. Expensive per-pixel calculations are traded for per-vertex calculations.

For example, lighting and viewing vectors L, V are transformed via matrix M(p) to corresponding vectors in tangent space $L_{TS}$, $V_{TS}$ at each vertex of a triangle. Once in tangent space, the transformed lighting and viewing vectors $L_{TS}$, $V_{TS}$, are interpolated on a per-pixel basis across each triangle. Normalizing tangent space vectors $L_{TS}$ and $V_{TS}$ improves accuracy. A tangent space half angle vector $H_{TS}$ is computed as the sum of normalized vectors $L_{TS}$ and $V_{TS}$, and then interpolated and normalized. In one lighting model, a diffuse component D is computed for each pixel, D being equal to $N'*L_{TS}$. A specular component S is computed for each pixel, S being equal to $(N'*H_{TS})^n$, where n is a specular power.

According to another embodiment of the present invention, an object space transform is used to define a transformation from eye space to object space. In one example, the object space transform module calculates an inverse of a modelview matrix where the modelview matrix defines a transformation from object space to eye space. Shading vectors defined at a surface point in eye space are transformed into an object space defined by an object space transform matrix. A bump mapping module performs a vector operation between the object space shading vector and a perturbed normal in object space at the surface point.

2. Terminology

The term "shading vector" and equivalents thereof refers to any vector used in a shading model. "Shading vector" can include, but is not limited to, a lighting vector, a viewing vector, and a half angle vector (also called a highlighting or halfway vector).

The terms "shading model", "lighting model", "illumination model", "global illumination model", and equivalents thereof, are used herein interchangeably to refer to any model or lighting equation that describes factors for determining a surface's color. The present invention can be applied with any illumination model including, but not limited to, the illumination models described herein as examples, and other known illumination models including, but not limited to, those described in Foley et al., chapter 16, pp. 721–814 (incorporated herein by reference above) and Beider et al., *OpenGL Programming Guide*, Silicon Graphics, Inc. (Addison-Wesley Publishing Co., 1993), chapter 6, pp. 157–194 (incorporated herein by reference).

3. Example Environment

The present invention is described in terms of an example computer graphics processing environment. Given the description herein, it would be obvious to one skilled in the art to implement the present invention in any computer graphics system including, but not limited to, a computer graphics processor (single chip or multiple chips), high-end to low-end graphics workstations, gaming platforms, systems and consoles, network architectures (e.g., client/server, local, intermediate or wide area networks), and virtual machine (e.g., a Java-created application). Any computer graphics architecture can be used including, but not limited to, an Open GL architecture (including but not limited to Indigo$^2$, Indy, Onyx, or O$_2$ graphics workstations manufactured by Silicon Graphics, Inc.) and raster graphics architectures, such as, those described in Foley et al., chapter 18, pp. 855–922 (incorporated herein by reference).

Description in these terms is provided for convenience only. It is not intended that the invention be limited to application in this example environment. In fact, after reading the following description, it will become apparent to a person skilled in the relevant art how to implement the invention in alternative environments.

4. Tangent Space Transform

Tangent space is a two-dimensional space defined by all points in a tangent plane $T_P$ at a point P on a graphics object surface. Thus, an object surface has infinitely many tangent spaces, which collectively, are known as a tangent bundle.

A local reference frame is created at each point P on the object surface. The local reference frame is an orthogonal reference frame defined by the tangent plane, a normal vector N, and a binormal vector B. The normal N is a vector positioned at point P and normal to the tangent plane. The binormal B is a vector equal to the cross product of N×T, where T is a vector which lies in the tangent plane to specify the orientation of the tangent plane about the normal N. The local reference frame can be normalized so that each vector T, B, N is a unit length.

According to the present invention, this local reference frame [T, B, N] is used to create a tangent space transform matrix M at point P, also called, a tangent space transform M(p) for short. Tangent space transform matrix M(p) is a three-by-three matrix. Vectors T, B, N at a point P form the columns (or rows) of the matrix M(p). In this way, matrix M(p) acts as a change of basis transform to a fixed flat Euclidean three space, also called, a canonical coordinate system.

In the computer graphics application of the present invention, the tangent space transform matrix M(p) transforms the tangent spaces of points on an object surface so that all corresponding tangent vectors are parallel, all binormal vectors are parallel, and all normal vectors are parallel. The object surface is typically defined with reference to a surface parametric function p(u,v) in a three-dimensional object space (x,y,z). Matrix M(p) then represents a tangent space transform that (1) maps the natural embedding of the tangent space of an object surface at point P to the x,y plane in object space and (2) maps the normal n to the z axis.

FIG. 1 shows a pictorial representation of an example tangent space transform operation used to provide high-quality, accelerated shading for a pear-shaped, textured object 100. Each point p (u,v) is transformed by matrix M(p) to form a corresponding tangent space transform image 110. Tangent space images 110 are then mapped to a texture map 120 using known texture mapping techniques. For example, an orthonormal transformation can be used to map each point in a 2-D texture space image 10 to a texture map in texture space (u,v).

As discovered by the inventors, a perturbed normal vector in tangent space can be derived as follows. A computer graphics object surface is typically defined with reference to a surface parametric function p(u,v) in a three-dimensional object space (x,y,z). Partial derivatives of a surface position in the u and v parametric directions are referred to as $P_u$ and $P_v$. As described above, a reference frame for a surface point p(u,v) can be defined by tangent, binormal, and normal vectors (T,B,N), where the tangent vector, $T=P_u/|P_u|$, and the binormal vector B=(N×T), and the normal vector N is normal to the surface point. $P_v$ is in the same plane as the tangent and binormal vectors, and can be expressed by the following equation:

$$P_v=(T \cdot P_v)T+(B \cdot P_v)B \qquad (3)$$

Therefore $$P_v \times N=(B \cdot P_v)T-(T \cdot P_v)B \qquad (4)$$

The normal perturbation (see Equation 2) is:

$$D=-f_u(P_v \times N)-f_v|P_u|B \qquad (5)$$

$$=-f_u(B \cdot P_v)T-(f_v|P_u|-f_u(T \cdot P_v))B \qquad (6)$$

Substituting the expression for D and $P_u \times P_v=|P_u \times P_v|N$ into Equation 1, normalizing, and taking $T_{TS}=(1, 0, 0)$, $B_{TS}=(0, 1, 0)$, and $N_{TS}=(0, 0, 1)$ leads directly to Equations 7–10 described below with reference to a surface dependent texture map.

5. Tangent Space Transform for Bump Mapping

FIG. 2A shows a routine 200 for bump mapping in tangent space according to one embodiment of the present invention. In step 210, a height field, also called a scalar height, displacement map, or bump map texture, is calculated. Preferably, the height field is defined by a function f(u,v) as is well-known in conventional bump mapping. The function f defines the deviation from a mean, unperturbed parametric surface p(u,v) of an object, where u, v are two coordinates in object space. The function f(u,v) and its operation in displacing an object surface p(u,v) in the direction of a surface normal is a well-understood aspect of bump map geometry. See, e.g., A. Watt et al., *Advanced Animation and Rendering Techniques* (Addison-Wesley: New York, N.Y.

1992), pp. 199–201 and Foley et al., *Computer Graphics: Principles and Practice*, 2nd. Ed. in C (Addison-Wesley: New York, N.Y. 1996), pp. 744 (both of which are incorporated herein by reference).

In step 220, the height field f(u,v) is converted to a texture map N'. Each texel in the texture map N' is defined by three components Nx', Ny', Nz' of a perturbed normal N'$_{TS}$.

As described below, the perturbed normal N'$_{TS}$ can be calculated to form a texture map N' that is either: Surface Dependent or Surface Independent.

a. Surface Dependent Texture Map

Conventional bump mapping approximations assume an object surface is locally flat at each surface point. See, Blinn, J. F., "Simulation of Wrinkled Surfaces", *Computer Graphics (SIGGRAPH '78 Proceedings)* (August 1978), vol. 12, pp. 286–292 (incorporated by reference in its entirety herein). Consequently, a bump mapping perturbation in tangent space, therefore, can be a function only of the local tangent space. As mentioned above, a local tangent space is defined according to the present invention, by a normal vector N, a tangent vector T=P$_u$/|P$_u$|, and a binormal vector B=N×T. Vectors T, B, and N form an orthonormal coordinate system in which to perform the bump mapping according to the present invention. In this tangent space, the tangent space perturbed normal vector N'$_{TS}$ has three components (Nx', Ny', Nz') corresponding to respective coefficients (a,b, c) defined as follows:

$$N'_{TS} = (N'x, N'y, N'z) = \frac{(a,b,c)}{\sqrt{a^2 + b^2 + c^2}} \quad (7)$$

$$a = -f_u(B \cdot P_v) \quad (8)$$

$$b = -(f_v|P_u| - f_u(T \cdot P_v)) \quad (9)$$

$$c = |P_u \times P_v| \quad (10)$$

The coefficients a, b, and c are a function of the surface itself (via P$_u$ and P$_v$) and the height field (via f$_u$ and f$_v$). Provided that the bump map is fixed to an object surface, the coefficients can be precomputed for that surface at each point of the height field and stored as a surface dependent texture map. Approximations can be made to relax the surface dependence as described below.

Preferably, the surface dependent texture map containing the perturbed normal vector is filtered like a simple texture using, for instance, tri-linear mipmap filtering or any other known filtering technique. The texels in the coarser levels of detail can be computed by filtering finer levels of detail and renormalizing, or by filtering the height field and computing the texels from it. Texel components can lie in a range −b 1to 1. Such filtering tends to average out the bumps at large minifications, leading to artifacts at silhouette edges. Proper filtering requires computing the reflected radiance over all bumps contributing to a single pixel. This technique is impractical for hardware systems. It should also be noted that, after mipmap filtering, the texture will no longer be normalized, so the surface dependent texture map is preferably normalized prior to lighting, as described further below.

b. Surface Independent Texture Map

Because the surface dependent texture map is a function of the object surface, the height field ƒ(u,v) can not be shared among surfaces with different parameterizations. This is particularly problematic when texture memory is restricted, as in a game system, or during design when a bump map is placed on a new surface interactively.

Approximations can be made to remove the surface dependence and create a surface independent texture map for bump mapping in tangent space according to the present invention. The surface dependence can be eliminated in a "square patch approximation" by assuming P$_u$ and P$_v$ are orthogonal ( P$_u$·P$_v$=0) and each have a magnitude equal to a constant k, where k is a constant giving a relative height of bumps. Under this square patch approximation, the equations for a tangent space perturbed normal N'$_{TS}$ reduce to the following:

$$N'_{TS} = (N'x, N'y, N'z) = \frac{(a,b,c)}{\sqrt{a^2 + b^2 + c^2}} \quad (11)$$

$$a = -kf_u \quad (12)$$

$$b = -kf_v \quad (13)$$

$$c = k^2 \quad (14)$$

Thus, the surface independent texture map, calculated in step 220 according to equations (11)–(14) above, is a function only of the height field and not of the surface geometry, so the surface independent texture map can be precomputed and used on any surface.

A surface independent texture map can be used for any general surface. Surfaces that are reasonably parameterized or which can be reparameterized are especially good. The square patch approximation holds for several important surfaces, such as spheres, torii, surfaces of revolution, and flat rectangles. In addition, the property is highly desirable for general surfaces because the further P$_u$ and P$_v$ are from orthogonal and equal in magnitude, the greater the warp in the texture map when applied to a surface. This warping is typically undesirable, see, e.g., J. Maillott et al., "Interactive Texture Mapping," *Computer Graphics (SIGGRAPH '93 Proceedings)*, vol. 27, August 1993, pp. 27–34 (incorporated herein by reference).

Steps 210 and 220 are preferably performed prior to real-time rendering. In this case, the texture map N' is pre-computed and stored in a texture memory, thereby, reducing the number of calculations required during rendering. Perturbed normal texture components, Nx', Ny', and Nz', are fetched from the texture memory during rendering as described below with respect to step 275.

Alternatively, with sufficient processing capability, steps 210 and 220 can be performed "on-the-fly" during rendering of a computer graphics image. Perturbed normal texture components, Nx', Ny', and Nz', calculated and stored on-the-fly, are fetched from texture memory during rendering as described below with respect to step 275.

In step 230, a tangent space transform matrix M(p) is built. As described above, the matrix M(p) is a three-by-three matrix whose rows (or columns) are formed of vectors T, B, and N at a point p(u,v). In one example, matrix M(p) provides a local reference frame defined as follows:

$$M(p) = \begin{bmatrix} t_x & t_y & t_z \\ b_x & b_y & b_z \\ n_x & n_y & n_z \end{bmatrix} \quad (15)$$

In step 240, shading vectors, including but not limited to, a lighting vector L and a viewing vector V are transformed by matrix M(p) into corresponding tangent space vectors L$_{TS}$, V$_{TS}$. This transformation is preferably carried out at each triangle vertex point p as follows:

$$L_{TS} = M(p) \cdot L \quad (16)$$

$$V_{TS} = M(p) V \quad (17)$$

The transformed lighting and viewing vectors L$_{TS}$, V$_{TS}$ are then interpolated on a per-pixel basis across each triangle (step 250) and normalized (step 260). In step 270, a half angle vector $H_{TS}$ is calculated in tangent space. Tangent space half angle vector $H_{TS}$ equals the sum of the normalized tangent space lighting and viewing vectors $L_{TS}$, $V_{TS}$. The tangent space half angle vector $H_{TS}$ is then interpolated (step 272) and normalized (step 274) across at least one corresponding triangle to increase accuracy.

Steps 250 and 272 can perform any type of interpolation across a polygon (e.g. a triangle) including, but not limited to, linear interpolation, barycentric interpolation, and higher-order interpolation (e.g., quadratic and cubic interpolation). Interpolating steps 250 and 272 are optional in that they can be omitted depending upon design needs. Normalizing steps 260 and 274 are also optional in that they can be omitted depending upon design needs. In general, any one, two, or three of the transformed shading vectors $L_{TS}$, $V_{TS}$, and $H_{TS}$ can remain uninterpolated and/or unnormalized if desired. In one alternative example, only the half angle $H_{TS}$ tangent space shading vector is interpolated and normalized (in other words, steps 250 and 260 (and modules 4420–4450 in FIG. 4A are omitted).

A lighting model is applied using the tangent space lighting and half angle vectors $L_{TS}$, $H_{TS}$ and perturbed normal texture components, Nx', Ny', and Nz'. The perturbed normal texture components, Nx', Ny', and Nz' are fetched from a texture memory (step 275) for use in computing a lighting equation (steps 280 and 290). For example, in step 280 a diffuse component D is calculated for each pixel. The diffuse D component represents the dot product of N' and $L_{TS}$ as follows:

$$D = Nx'^* L_{TSx} + Ny'^* L_{TSy} + Nz'^* L_{TSz} \quad (18)$$

where Nx', Ny' and Nz' are the three component texture values in the perturbed normal N' calculated and stored in step 220 and $L_{TSx}$, $L_{TSy}$, and $L_{TSz}$ are the x, y, and z components respectively of tangent space lighting vector $L_{TS}$.

A specular component S is similarly calculated for each pixel (step 290). The S component represents the dot product of N' and HTS as follows:

$$S = (Nx'^* H_{TSx} + Ny'^* H_{TSy} + Nz'^* H_{TSz})^n \quad (19)$$

where Nx', Ny' and Nz' are the three component texture values in the perturbed normal N' texture map calculated in step 220, $H_{TSx}$, $H_{TSy}$, and $H_{TSz}$ are the x, y, and z components respectively of tangent space half angle vector $H_{TS}$, and n is an integer representing the specular power.

The diffuse and specular components can then be used in any lighting equation to determine a color value for a respective pixel. This color value is also called a radiance, lighting, or luminous value. Depending upon the illumination model selected, effects related to lighting an object can be accounted for including but not limited to: material emission representing the object's material, global ambient light scaled by the material's ambient property, and ambient, diffuse, and specular contributions from all light sources properly attenuated. See, for example, the mathematics of lighting described in Beider et al., pp. 182–194 and Foley et al., chap. 16, pp. 721–814 (incorporated above by reference). One example of an entire lighting calculation used to determine final color value $C_s$ for an example illumination model in the present invention is given by the following equation:

$$C_S = E_m + A_m \cdot A_s + \left( \sum_{i=0}^{n-1} A_{tt} \cdot \text{Spot}L \cdot \right. \quad (20)$$
$$S(A_m \cdot A_l + D_m \cdot D_l \cdot (l_z) + S_m \cdot S_l \cdot (H_z)^n)) + S_m \cdot Env;$$

wherein, $E_m$ represents emissivity, $A_m$ is a material ambient coefficient, $A_s$ is a scene ambient coefficient, $A_l$ is an ambient light color, $A_{tt}$ is an attenuation factor, SpotL is a spotlight attenuation factor, S is a shadow coefficient, $D_m$ is a diffuse material coefficient, $D_l$ is diffuse light color, $S_m$ is a specular material coefficient, $S_l$ is specular light color, n is the specular power (e.g., shininess), and Env is an environment mapping coefficient. The summation sign sums overall lights n, and like other terms in the lighting equation can be omitted depending upon a particular illumination model.

Bump mapping in tangent space routine 200 can be implemented primarily as software, firmware, hardware, or any combination thereof in any computer graphics system. Preferably, the bump mapping in tangent space routine 200 is implemented in a lighting and coloring stage of a graphics engine subsystem. In one example, per-vertex operations can be implemented primarily in software and per-pixel operations can be implemented primarily in hardware.

Examples of a graphics processing environment and graphics subsystem architecture providing accelerated bump mapping in tangent space according to the present invention is described below with respect to FIGS. 2B, 3, 4A and 4B. An example computer graphics system having a graphics engine subsystem is described with respect to FIG. 8.

Figure 2B:
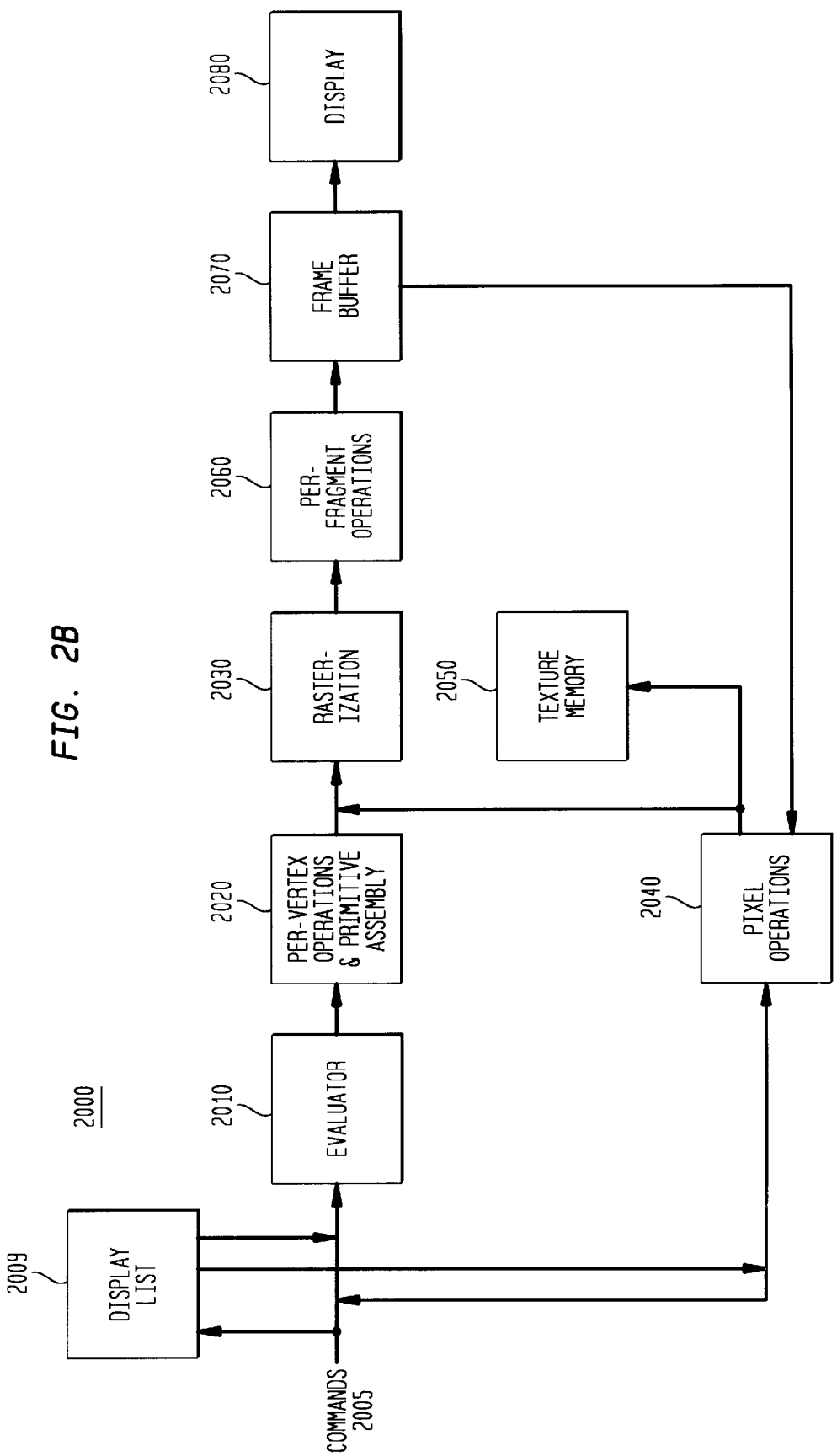
FIG. 2B is a block diagram of an example graphics processing pipeline for bump mapping in tangent space according to the present invention.

FIG. 2B is a block diagram of an example graphics processing pipeline environment 2000 for implementing routine 200 as described above. Graphics processing environment 2000 can include but is not limited to an OpenGL operation as described in Beider et al., *OpenGL Programming Guide, The Official Guide to Learning OpenGL*, Release 1, Silicon Graphics Inc. (Addison-Wesley Publishing Co., USA, 1993) and *OpenGL Reference Manual, The Official Reference Document for OpenGL*, Release 1, Silicon Graphics Inc. (Addison-Wesley Publishing Co., USA, 1992) (both of which are incorporated in their entirety herein by reference).

As shown in FIG. 2B, graphics processing pipeline 2000 consists of a display list 2009, evaluator 2010, per-vertex operations and primitive assembly stage 2020, rasterization stage 2030, pixel operations stage 2040, texture memory 2050, per-fragment operations stage 2060, frame buffer 2070, and a computer graphics display unit 2080. Commands 2005 are input to the graphics processing pipeline 2000. Commands 2005 specify geometric objects to be drawn and control how the objects are handled during the various processing stages. Commands 2005 can be processed immediately through the pipeline 2000 or can be accumulated in display list 2009 for processing at a later time.

Evaluator 2010 approximates curve and surface geometry by evaluating polynomial commands of input values. During the next stage, per-vertex operations and primitive assembly stage 2020 processes geometric primitives. Geometric primitives are points, line segments, triangles, and polygons, all of which are described by vertices. Vertices are transformed and lit, and primitives are clipped to a viewport in preparation for the rasterization stage 2030.

Rasterization stage 2030 produces a series of frame buffer addresses and associated values using a two-dimensional description of a point, line segment, triangle, or polygon. Each fragment produced in rasterization stage 2030 is fed into the last stage, per-fragment operations stage 2060.

Per-fragment operations stage 2060 performs the final operations on graphics data before the data stored as pixels in frame buffer 2070. These final operations can include conditional updates to the frame buffer 2070 based on incoming and previously stored Z values for Z buffering, blending of incoming pixel colors with stored colors, masking, and other logical operations on pixel values.

Input graphics data can be in the form of pixels rather than vertices. For example, an image used in texture mapping is processed in a pixel operation stage 2040. Pixel operation stage 2040 processes graphics data as pixels and stores a resulting texture map in texture memory 2050. Rasterization stage 2030 can then use the texture map stored in texture memory 2050 for performing texture processing. The output from pixel operations stage 2040 can also be applied directly to rasterization stage 2030 and merged with resulting fragments into frame buffer 2070 just as if the output was generated from geometric data.

In one embodiment of the present invention, the routine for bump mapping in tangent space 200 is implemented in graphics processing pipeline 2000 as follows. Texture memory 2050 is used to store texture map N' generated in step 220. Steps 230 and 240 for building a tangent space transfer matrix M and transforming shading vectors are processed as per-vertex operations in the per-vertex operations and primitive assembly stage 2020.

Steps 250 to 290 are processed on a per-pixel basis in pixel operations stage 2040. To perform steps 280 and 290 the texture map M' stored in texture memory 2050 is accessed. Pixel operations stage 2040 (or alternatively per-vertex operations and primitive assembly stage 2020) can output a color value based on the diffuse and specular components calculated in routine 200 to rasterization stage 2030 for processing.

Figure 3:
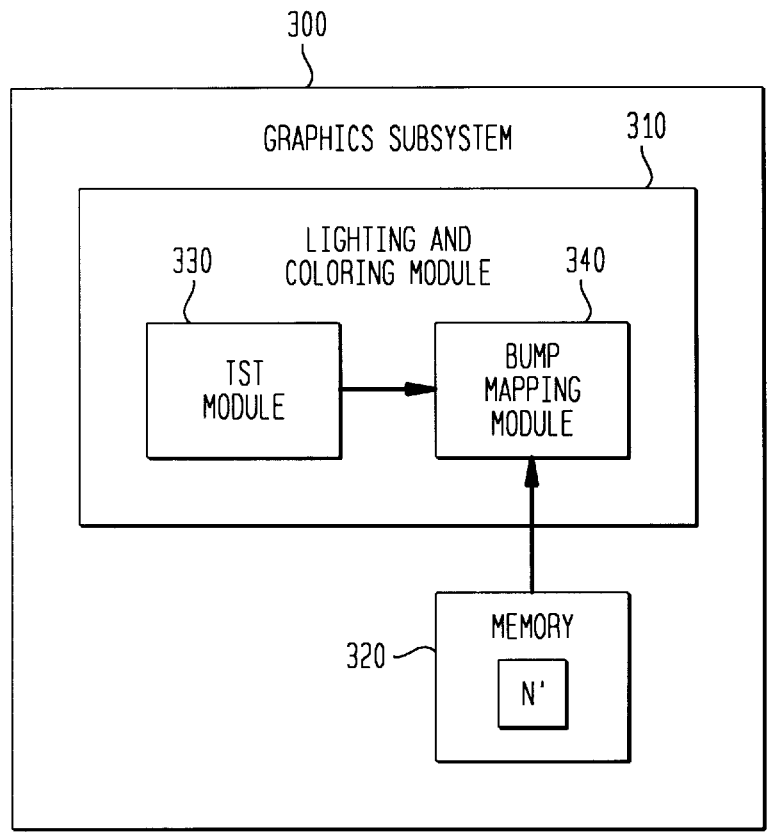
FIG. 3 is a block diagram of a graphics subsystem for bump mapping in tangent space according to the present invention.

FIG. 3 is a schematic diagram showing an example graphics subsystem 300 implementing bump mapping in tangent space according to the present invention. A lighting and coloring module 310 includes a tangent space transform (TST) module 330 and a bump mapping module 340. A memory 320 stores a perturbed normal texture map N'.

FIG. 4A shows a logical architecture for lighting and coloring module 310 in more detail. A texture map generator 405 converts a 1-D or 2-D height field 403 to a three-component texture map N' as described above with respect to steps 210–220. The three components of the texels are Nx', Ny', Nz' as defined above in equations (1)–(3). The texture map N' is then stored in memory 320. Preferably, texture map generator 405 precomputes and stores the texture map N' prior to rendering an image. In one embodiment, texture map generator 405 is implemented primarily in software as a program module that can be executed by a graphics processor or another processor.

TST module 330 transforms shading vectors into tangent space. Shading vectors can include, but are not limited to, lighting and viewing vectors L, V. Tangent space transform matrix module 432 builds a tangent space transform matrix M(p). Matrix M(p) has rows (or columns) defined by vectors t, b, n at point p(u,v) as described above with respect to step 230. Transform module 434 multiplies each shading vector by the matrix M(p). In this example, lighting and viewing vectors L, V are transformed by matrix M(p) to corresponding vectors $L_{TS}$, $V_{TS}$.

Bump mapping module 340 receives shading vectors in tangent space and applies bump mapping based on the perturbed normal N' stored in memory 320. In particular, interpolator 4420 interpolates the tangent space lighting vector $L_{TS}$ across at least one corresponding polygon (e.g. triangle) on a per-pixel basis. Interpolator 4430 interpolates viewing vector $V_{TS}$ across at least one corresponding polygon (e.g. triangle) on a per-pixel basis.

To further improve accuracy, normalizer 4440 normalizes the interpolated tangent space lighting vector $L_{TS}$. Normalizer 4450 normalizes the interpolated tangent space viewing vector $V_{TS}$. Sum block 4460 sums the outputs of both normalizers 4450, 4460 to generate a tangent space half angle vector $H_{TS}$. Interpolator 4462 interpolates the tangent space half angle vector $H_{TS}$ across at least one corresponding polygon (e.g. triangle). Normalizer 4464 then normalizes the interpolated tangent space half angle vector $H_{TS}$.

For each pixel, dot product unit 4470 computes a dot product between a corresponding texel value (Nx', Ny', Nz') fetched from memory 320 and the interpolated, normalized, tangent space lighting vector $L_{TS}$ output from normalizer 4440. A diffuse component value D is output from dot product unit 4470.

Similarly, dot product unit 4480 computes a dot product between a corresponding texel value (Nx', Ny' Nz') fetched from memory 320 and the interpolated, normalized, tangent space half angle vector $H_{TS}$ output from normalizer block 4464. Specular power block 4490 raises the output from dot product unit 4480 to a specular power n, where n is an integer (e.g. 2) representing specular power being modeled on the graphics object. For example, specular power block 4490 can use a power look up table as used in OpenGL programming.

As described with respect to steps 250 and 272 above, interpolators 4420, 4430, and 4462 can perform any type of interpolation across a polygon (e.g. a triangle) including, but not limited to, linear interpolation, barycentric interpolation, and higher-order interpolation (e.g., quadratic and cubic interpolation). Interpolators 4420, 4430, and 4462 are optional in that they can be omitted depending upon design needs. Normalizers 4440, 4450, and 4464 are also optional in that they can be omitted depending upon design needs. In general, any combination of zero or more interpolators 4420, 4430, and 4462 and normalizers 4440, 4450, and 4464 can be used. In one alternative example, only the half angle $H_{TS}$ tangent space shading vector is interpolated and normalized (in other words, modules 4420–4450 are omitted).

Lighting equation block 450 completes lighting and coloring according to a lighting equation used in an illumination model. Block 450 outputs a final color value Cs based on the diffuse D and specular S components output from bump mapping module 340. For example, block 450 can compute a value Cs as described above with respect to equation (20).

Figure 4B:
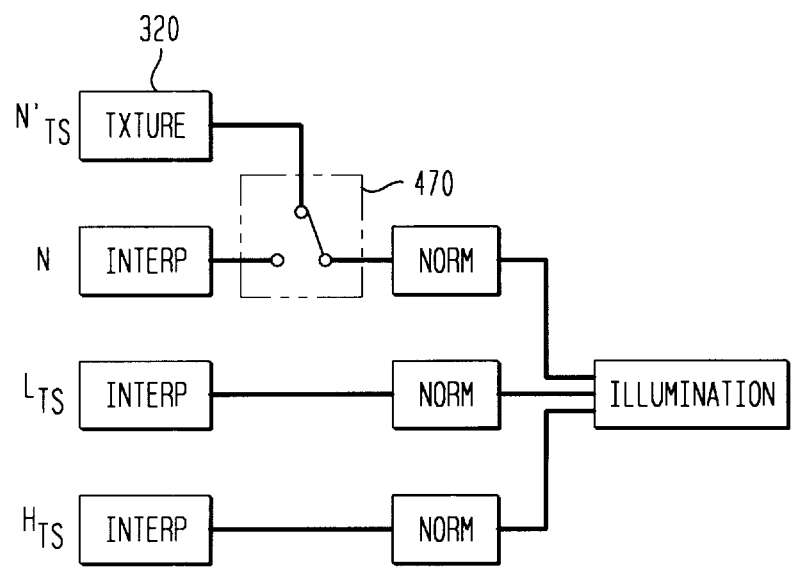
FIG. 4B is a block diagram illustrating one example of rasterization hardware for supporting Phong shading and tangent space bump mapping according to the present invention.
Figure 4A:
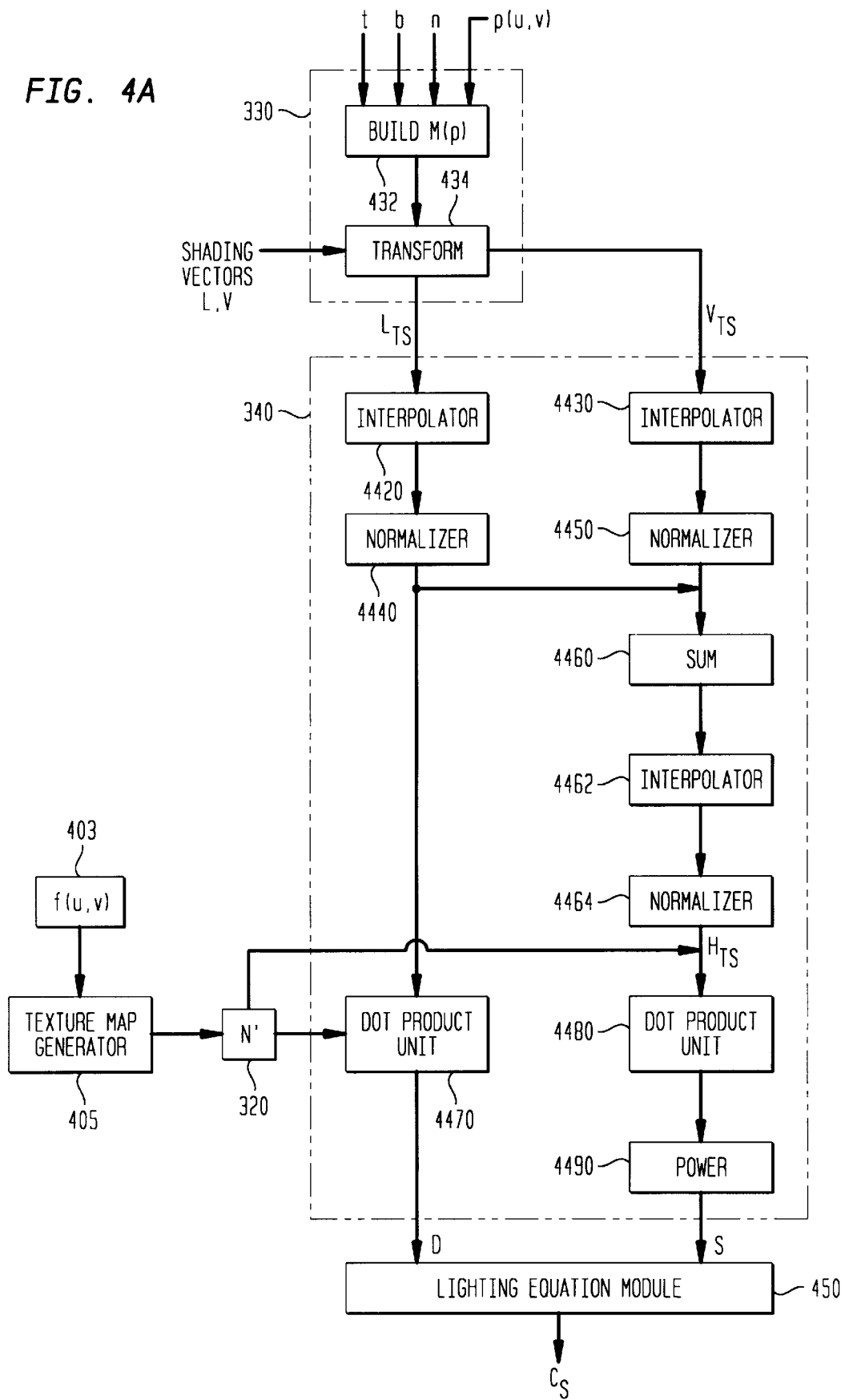
FIG. 4A is a block diagram showing components of the present invention in the lighting and coloring module of FIG. 3 in more detail.
Figure 11A:
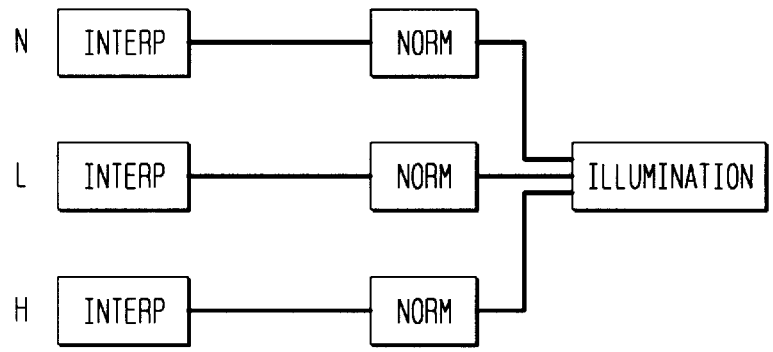
FIG. 11A is a block diagram illustrating an example of conventional Phong shading hardware.

FIG. 4B is provided to illustrate even more clearly how the present invention provides tangent space bump mapping without requiring any significant new rasterization hardware beyond that used in Phong shading. As evident by comparing FIG. 11A (discussed earlier) and FIG. 4B, to support tangent space bump mapping, according to one example of the present invention, only a single switch 470 (or multiplexer) need be added in a conventional graphics hardware system having a texture memory and Phong shading rasterization hardware. This is a much greater hardware savings than the bump mapping example shown in FIG. 11B.

c. Examples

Figure 5A:
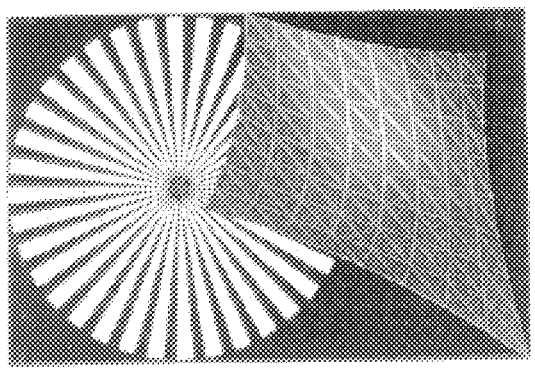
FIG. 5A illustrates an example pinwheel height field used as a bump map for a tesselated, bicubic surface in computer simulations.
Figure 5B:
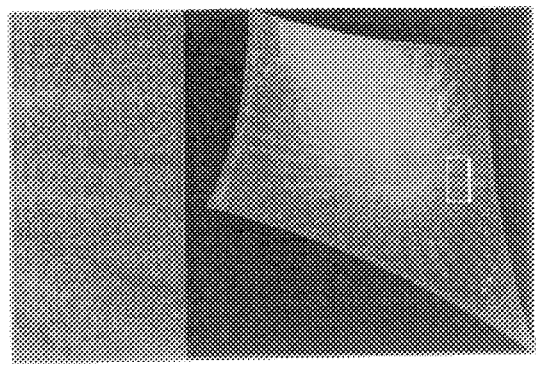
FIG. 5B shows a bump-mapped image, and a detailed inset thereof, obtained in a simulation of the expensive hardware of FIG. 11B, using the bump map and object surface of FIG. 5A.
Figure 5C:
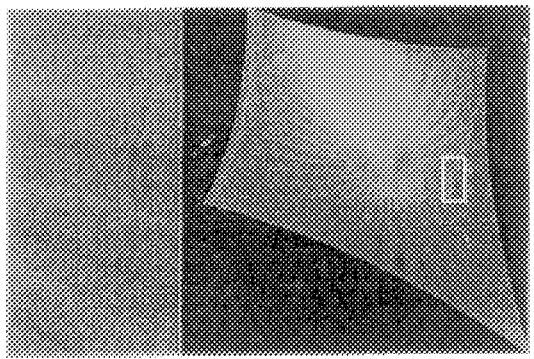
FIG. 5C shows a bump-mapped image, and a detailed inset thereof, obtained in a simulation of a surface dependent texture map embodiment of the present invention, using the bump map and object surface of FIG. 5A.
Figure 5D:
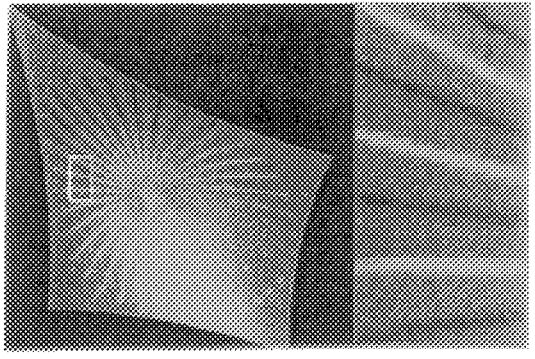
FIG. 5D shows a bump-mapped image, and a detailed inset thereof, obtained in a simulation of a surface independent texture map embodiment of the present invention, using the bump map and object surface of FIG. 5A.

FIGS. 5B to 5D compare software simulations of the various bump mapping implementations. All of the images, including the height field, have a resolution of 512×512 pixels. The height field, FIG. 5A, was chosen as a pinwheel to highlight filtering and implementation artifacts, and the surface, FIG. 5A, was chosen as a highly stretched bicubic patch subdivided into 8×8×2 triangles to ensure that $P_u$ and $P_v$ deviate appreciably from orthogonal. The texture maps were filtered with trilinear mipmapping.

Figure 11B:
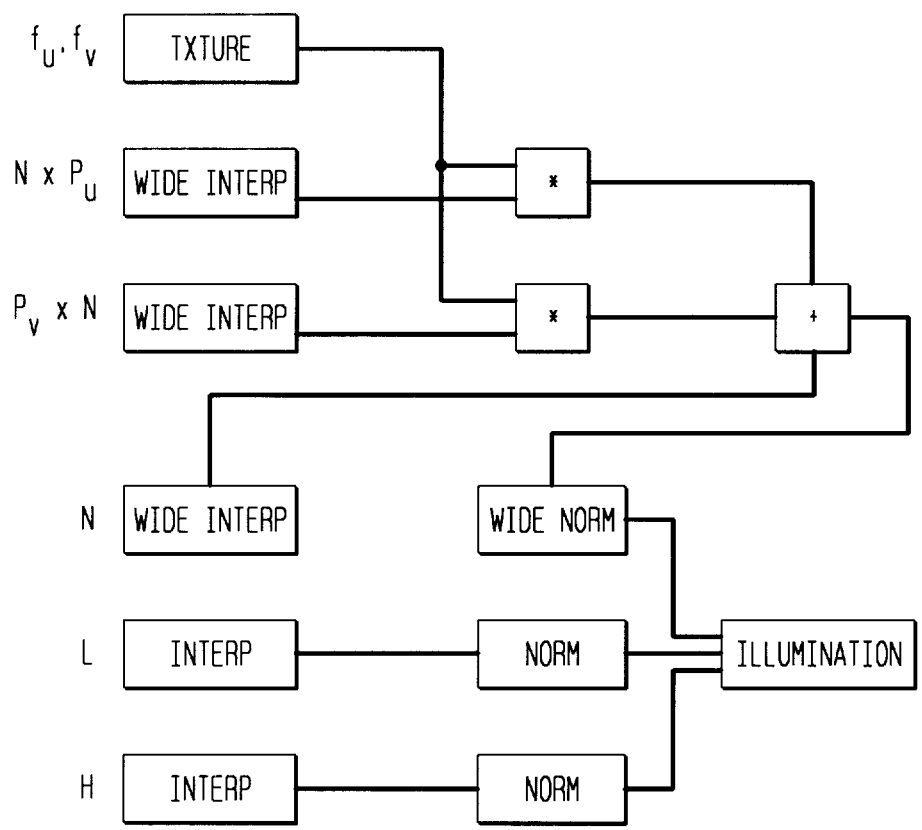
FIG. 11B is a block diagram illustrating an example of bump mapping hardware that is more expensive than the present invention.

FIG. 5B shows the image computed from the implementation of bump mapping from FIG. 11B. The partial derivatives, $f_u$ and $f_v$, in this texture map and the others were computed with the derivative of a Gaussian covering seven by seven samples.

FIGS. 5C and 5D show an implementation based on the hardware of FIG. 4B; they differ only in the texture map that is employed. FIG. 5C uses a surface dependent texture map based on Equations 7–10. Each texel was computed from the analytic values of $P_u$ and $P_v$ for the bicubic patch. The difference between this image and FIG. 5B is almost imperceptible, even under animation, as can be seen in the enlarged insets. The texture map used in FIG. 5D is based on Equations 11–14, where the surface dependence has been removed. Minor differences can be seen in the rendered image compared to FIGS. 5B and 5C; some differences are visible in the inset. All three example implementations have similar filtering qualities and appearance during animation.

6. Multiple Rendering Passes

Another embodiment of the present invention creates a new bump mapped texture for every change in the lighting or viewing position. Multiple rendering passes are made to form a combination of images. The combination of images produces a lit image that approximates bump mapping using a tangent space transform as described above. An example of this multiple rendering passes embodiment is described in more detail with respect to FIGS. 6A, 6B, 7A and 7B.

FIG. 6A shows a shade tree representation for bump mapping in tangent space according to the multiple rendering passes embodiment of the present invention. Shade tree 600 is specified in tangent transform space as defined by matrix M(p) described above. Shade tree 600 has a bump map root image or lit image 610 and a plurality of leaf images 620. Each leaf image 621–627 is combined arithmetically as shown in the shade tree 600 (and described in further detail in FIGS. 7A and 7B) to create the lit image 610. The lit image 610 can then be used as a texture map. Lit image 610 is texture mapped to an object (e.g., a torus) for display as a computer graphic image 630.

Figure 7A:
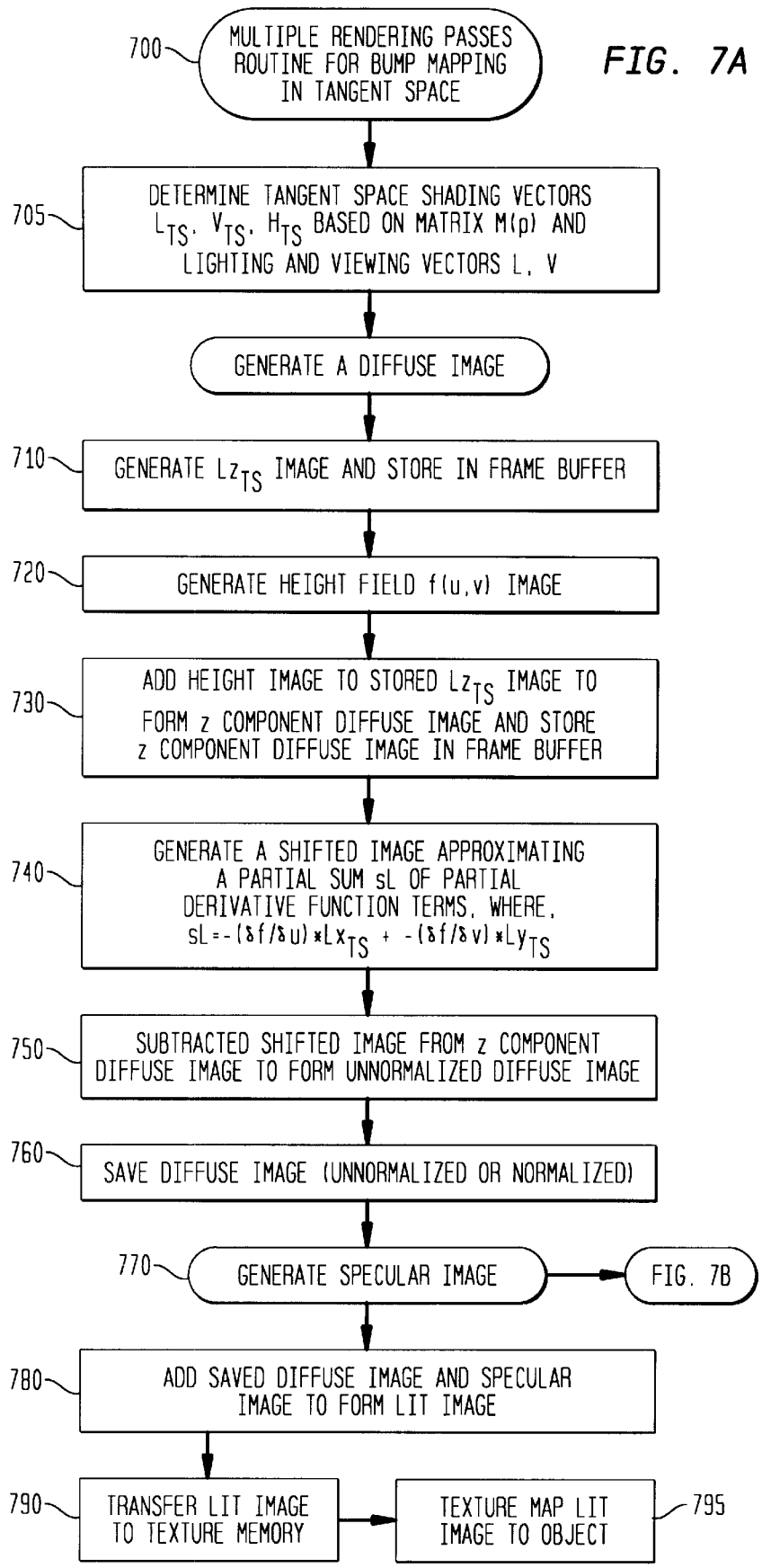
FIGS. 7A and 7B show an example multiple rendering passes routine for bump mapping in tangent space according to the present invention.
Figure 7B:
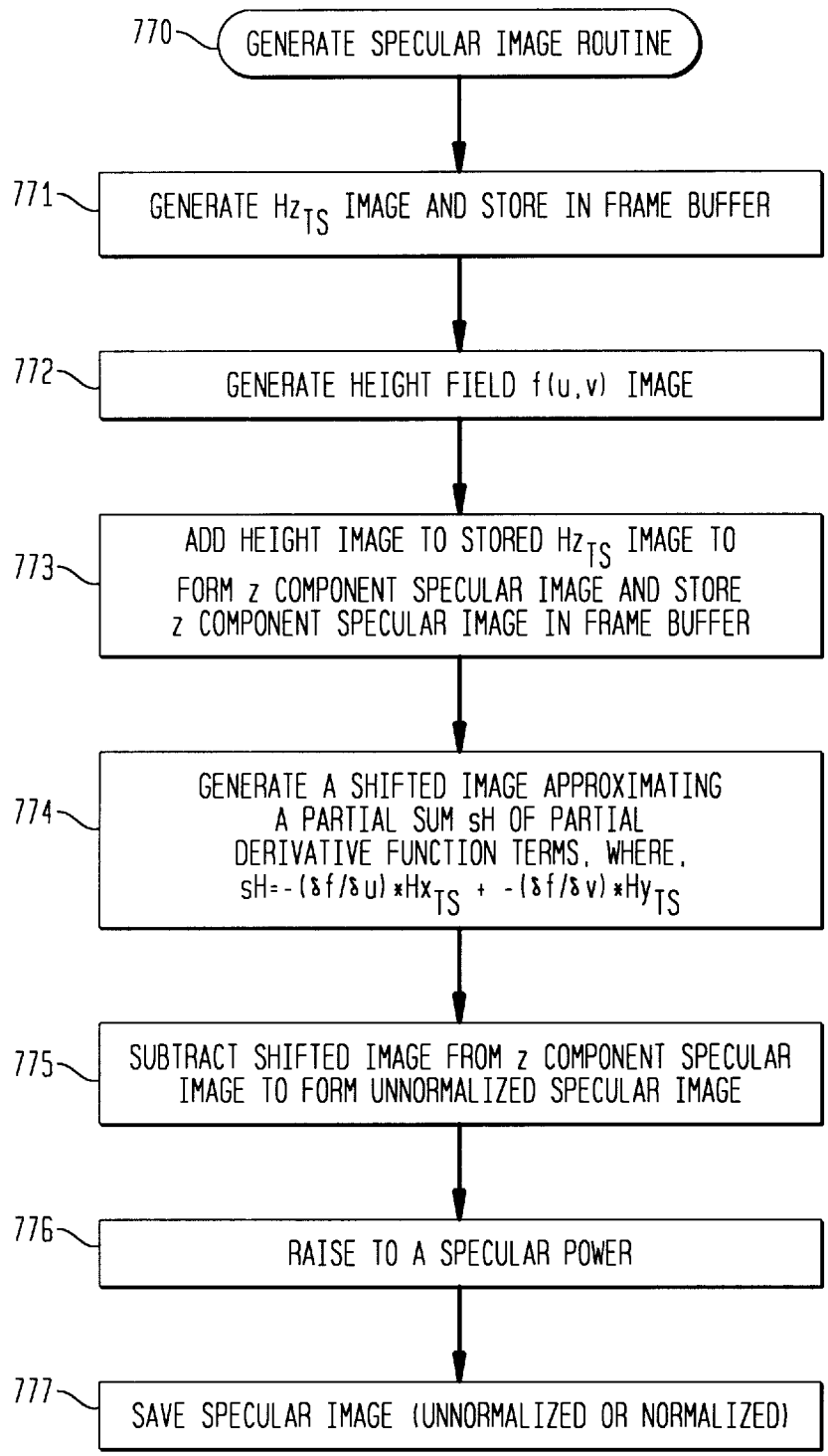

FIGS. 7A and 7B show an example multiple rendering pass routine 700 according to the present invention.

Routine 700 will be described with reference to shade tree 600 in FIG. 6A for greater clarity. First, in step 705, tangent space shading vectors $L_{TS}$, $V_{TS}$, and $H_{TS}$ are determined based on matrix M(p) and lighting and viewing vectors L, V. These transformation calculations are performed as described above with respect to sections 4 and 5, and FIGS. 1 and 2A.

Next, a diffuse image is generated (steps 710 to 760). In step 710, a $Lz_{TS}$ image 621 is generated and stored in a frame buffer (or other memory storage area). The $Lz_{TS}$ image, for example, can be a dot product between the unperturbed normal N' and vector L. Because in tangent space the unperturbed normal N' has components (0,0,1) and the lighting vector L has components(Lx, Ly, Lz), the dot product is called $Lz_{TS}$ representing the z component of the lighting vector L for the unbumped surface.

Next, height image 622 is generated (step 720). The height image represents height field f(u,v) as described earlier with respect to step 210. The height image 622 can be generated by drawing the height field f (u,v) as a grey scale image. The height image 622 is added to the stored $Lz_{TS}$ image 621 to form a z component diffuse image. In step 730, the z component diffuse image is stored in the frame buffer (or other memory storage area).

In step 740, a shifted image 623 is generated. The shifted image approximates a partial sum sL of partial derivative function terms, where $$sL = -\left(\frac{\partial f}{\partial u}\right) * Lx_{TS} + -\left(\frac{\partial f}{\partial v}\right) * Ly_{TS} \qquad (21)$$

For example, the shifted image 623 can be generated by drawing the height field f(u,v) as a grey scale image (e.g. height image 622) and then shifting pixels in the tangent and binormal directions. In particular, pixels are shifted by −Lx/deltaΔ in the tangent direction and shifted by −Ly/deltaΔ in the binormal direction. DeltaΔ is preferably selected so that it describes one pixel in the coordinate space used to represent the shifted image 623.

In step 750, the shifted image generated in step 740 is subtracted from the z component diffuse image stored in step 730 to form an unnormalized diffuse image. This unnormalized diffuse image approximates the sum of partial derivative function terms sL+Lz. A color image 624 can be optionally added to the unnormalized diffuse image. The unnormalized diffuse image or alternatively, a normalized diffuse image is then saved (step 760). The saved diffuse image can be saved in a frame buffer (or other memory storage area). To normalize the unnormalized diffuse image, additional steps (not shown) are performed. A normalizer image is drawn consisting of a multiplier equal to the value given for Nz' in equation (11) above, that is, $c/(a^2+b^2+c^2)^{1/2}$ or $1/(1+f_u*f_u+f_v*f_v)^{1/2}$, where k=1. The normalizer image is then multiplied with the unnormalized diffuse image calculated in step 750 to form a normalized diffuse image.

Next, a specular image is generated (step 770). The specular image is generated similarly to the diffuse image except that a tangent space half angle vector $H_{TS}$ is operated on in place of a tangent space lighting vector $L_{TS}$ (see FIG. 7B, steps 771–776). In step 780, the diffuse image and specular image are added to form a lit image 610. The lit image 610 is then transferred to a texture memory (step 790). Conventional texture mapping techniques are used to texture map the lit image 610 to an object, such as, a torus (step 795). In this way, a lit bumped image 630 is formed.

As shown in FIG. 7B, to generate a specular image, an $Hz_{TS}$ image 625 is first generated and stored in a frame buffer or other memory storage area (step 771). A height field f(u,v) image 626 is generated, if necessary, otherwise height field image 622 is used (step 772). In step 773, the height image 626 generated step 772 is added to the stored $Hz_{TS}$ image 625 to form a z component specular image. The z component specular image is then stored in a frame buffer or other memory storage area.

In step 774, a shifted image 627 is generated that approximates a partial sum sH of partial derivative function terms, where, $$sH = -\left(\frac{\partial f}{\partial u}\right) * Hx_{TS} + -\left(\frac{\partial f}{\partial v}\right) * Hy_{TS} \qquad (22)$$

For example, the shifted image 627 can be generated by drawing the height field f(u,v) as a grey scale image (e.g. height image 626) and then shifting pixels in the tangent and binormal directions. In particular, pixels are shifted by −$Hx_{TS}$/deltaΔ in the tangent direction and shifted by −$Hy_{TS}$/deltaΔ in the binormal direction. DeltaΔ is preferably selected so that it describes one pixel in the coordinate space used to represent the shifted image 623.

Next, the shifted image 627 generated in step 774 is subtracted from the z component specular image stored in step 773 to form an unnormalized specular image (step 775). The unnormalized specular image is further raised to a specular power n (step 776). For example, a power look up table can be used. A specular image (unnormalized or normalized by the multiplier described with respect to the diffuse image) is then saved in a frame buffer or other memory storage area. (step 777).

FIG. 6B shows a screen space shade tree for bump mapping analogous to FIG. 6A. The tangent transform space images can be applied to the object geometry as they are computed. The composition operates on the scan converted pixels. A final pass to texture map an image onto the geometry is avoided.

The multiple rendering passes embodiment as described with respect to FIGS. 6, 7A, and 7B can be implemented as software, firmware, hardware, or any combination thereof in a computer graphics processor. In one preferred implementation, routine 700 is written as an OpenGL program for execution on any OpenGL machine including, but not limited to, Imago, IRIS, or $O_2$ graphics workstations manufactured by Silicon Graphics, Inc.

7. Example GUI Computer Environment

FIG. 8 is a block diagram illustrating an example environment in which the present invention can operate. The environment is a computer system 800 that includes one or more processors, such as processor 804. Computer system 800 can include any type of computer graphics computer, virtual machine, processor (single bus, multiple bus, or bus-less processor(s)), workstation, and network architecture. In one preferred implementation, an OpenGL machine can be used including, but not limited to, Indigo$^2$, Indy, Onyx, or $O_2$ graphics workstations manufactured by Silicon Graphics, Inc.

The processor 804 is connected to a communications bus 802. Various software embodiments are described in terms of this example computer system. This description is illustrative and not intended to limit the present invention. After reading this description, it will be apparent to a person skilled in the relevant art how to implement the invention using other computer systems and/or computer architectures.

Computer system 800 includes a graphics subsystem 803. Graphics subsystem 803 can be implemented as one or more processor chips. The graphics subsystem 803 can be included as part of processor 804 as shown in FIG. 8 or as a separate graphics engine or processor. Graphics data is output from the graphics subsystem 803 to the bus 802. Display interface 805 forwards graphics data from the bus 802 for display on the display unit 806.

Computer system 800 also includes a main memory 808, preferably random access memory (RAM), and can also include a secondary memory 810. The secondary memory 810 can include, for example, a hard disk drive 812 and/or a removable storage drive 814, representing a floppy disk drive, a magnetic tape drive, an optical disk drive, etc. The removable storage drive 814 reads from and/or writes to a removable storage unit 818 in a well known manner. Removable storage unit 818 represents a floppy disk, magnetic tape, optical disk, etc., which is read by and written to by removable storage drive 814. As will be appreciated, the removable storage unit 818 includes a computer usable storage medium having stored therein computer software and/or data.

In alternative embodiments, secondary memory 810 may include other similar means for allowing computer programs or other instructions to be loaded into computer system 800. Such means can include, for example, a removable storage unit 822 and an interface 820. Examples can include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to computer system 800.

Computer system 800 can also include a communications interface 824. Communications interface 824 allows software and data to be transferred between computer system 800 and external devices via communications path 826. Examples of communications interface 824 can include a modem, a network interface (such as Ethernet card), a communications port, etc. Software and data transferred via communications interface 824 are in the form of signals which can be electronic, electromagnetic, optical or other signals capable of being received by communications interface 824, via communications path 826. Note that communications interface 824 provides a means by which computer system 800 can interface to a network such as the Internet.

Graphical user interface module 830 transfers user inputs from peripheral devices 832 to bus 802. These peripheral devices 832 can be a mouse, keyboard, touch screen, microphone, joystick, stylus, light pen, voice recognition unit, or any other type of peripheral unit.

The present invention is described in terms of this example environment. Description in these terms is provided for convenience only. It is not intended that the invention be limited to application in this example environment. In fact, after reading the following description, it will become apparent to a person skilled in the relevant art how to implement the invention in alternative environments.

The present invention is preferably implemented using software running (that is, executing) in an environment similar to that described above with respect to FIG. 8. In this document, the term "computer program product" is used to generally refer to removable storage unit 818 or a hard disk installed in hard disk drive 812. These computer program products are means for providing software to computer system 800.

Computer programs (also called computer control logic) are stored in main memory and/or secondary memory 810. Computer programs can also be received via communications interface 824. Such computer programs, when executed, enable the computer system 800 to perform the features of the present invention as discussed herein. In particular, the computer programs, when executed, enable the processor 804 to perform the features of the present invention. Accordingly, such computer programs represent controllers of the computer system 800.

In an embodiment where the invention is implemented using software, the software may be stored in a computer program product and loaded into computer system 800 using removable storage drive 814, hard drive 812, or communications interface 824. Alternatively, the computer program product may be downloaded to computer system 800 over communications path 826. The control logic (software), when executed by the processor 804, causes the processor 804 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s).

8. Object Space Transform

If a texture map is a function of the surface parameterization, another implementation is possible: the lighting model can be computed in object space rather than tangent space. Instead of using a matrix M(p) defined with t, b, n at each point on the surface, an inverse of a modelview matrix is used to transform lighting and half angle vectors. For example, a modelview matrix can be, but is not limited to, a 4×4 matrix that transforms points, lines, polygons, and raster positions from object coordinates to eye coordinates. See, e.g., the modelview matrix for an OpenGL system described in Chapter 3, pp. 63–116 of *OpenGL Programming Guide* incorporated by reference herein. The inverse of a modelview matrix can be calculated according to any conventional inverse matrix calculation technique.

The texture memory stores the perturbed normal vectors in object space, and the light and half angle vectors are transformed into object space at the polygon vertices and interpolated as described above with respect to FIGS. 2A, 2B, 3, 4A, and 4B. Thus, the matrix transformation applied to the light and half angle vectors is shared by all vertices, rather than one transformation for each vertex. This implementation keeps the rasterization hardware of FIG. 4B, significantly reduces the overhead in a geometry processor, and can coexist with tangent space bump mapping embodiments described above with respect to FIG. 2A, 2B, 3, 4A and 4B.

Figure 9:
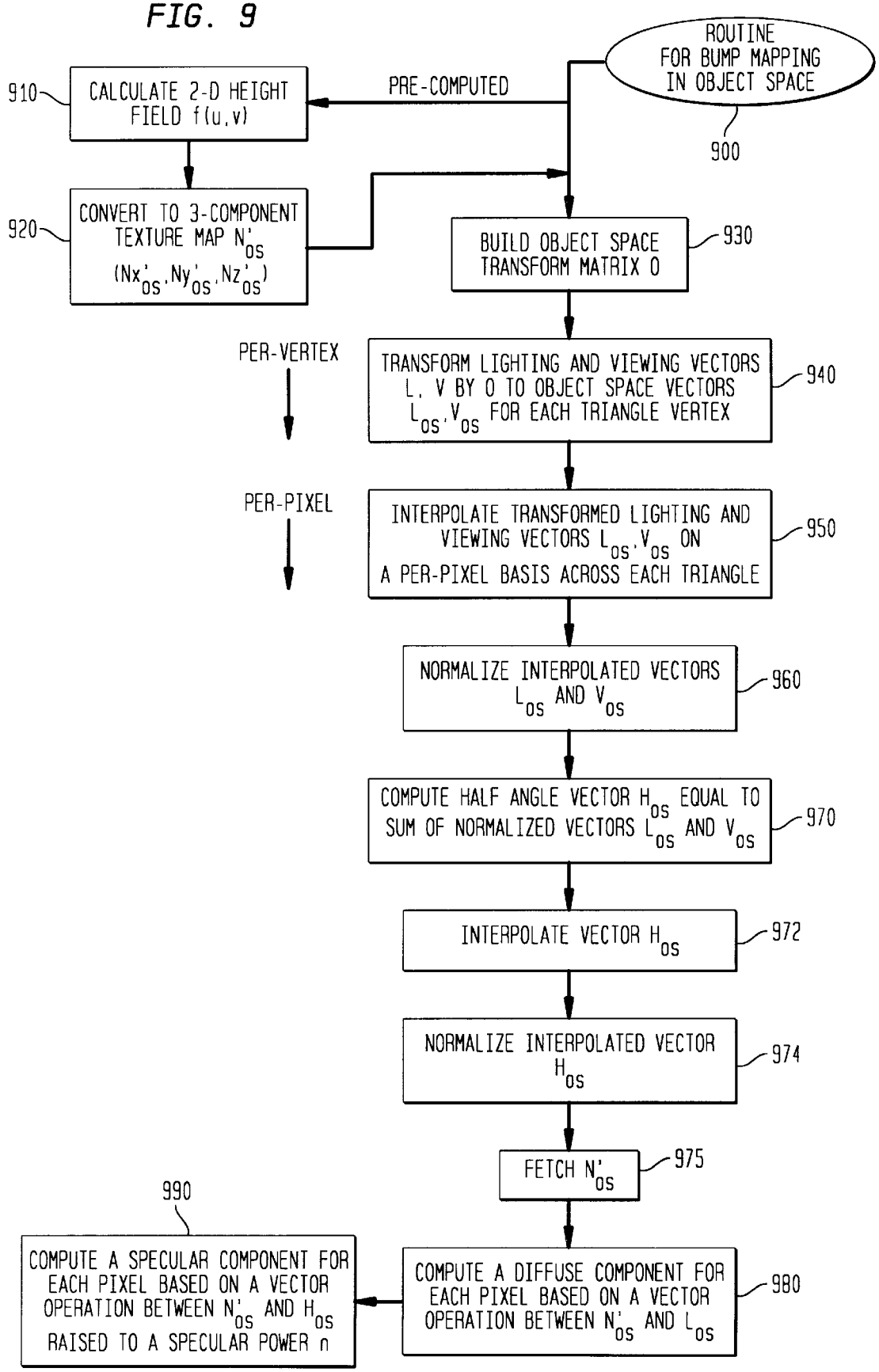
FIG. 9 is a flowchart of a routine for bump mapping in object space according to one embodiment of the present invention.

FIG. 9 shows a routine 900 for bump mapping in object space according to one embodiment of the present invention. In step 910, a height field, also called a scalar height, displacement map, or bump map texture, is calculated. Preferably, the height field is defined by a surface parameterization function f(u,v) as is well-known in conventional bump mapping. The function f defines the deviation from a mean, unperturbed parametric surface p(u,v) of an object, where u, v are two coordinates in object space. The function f(u,v) and its operation in displacing an object surface p(u,v) in the direction of a surface normal is a well-understood aspect of bump map geometry. See, e.g., A. Watt et al., *Advanced Animation and Rendering Techniques* (Addison-Wesley: New York, N.Y. 1992), pp. 199–201 and Foley et al., *Computer Graphics: Principles and Practice,* 2nd. Ed. in C (Addison-Wesley: New York, N.Y. 1996), pp. 744 (both of which are incorporated herein by reference).

In step 920, the height field f(u,v) is converted to a object space perturbed normal texture map $N'_{OS}$. The object space perturbed normal texture map $N'_{OS}$ ; has texels defined by three perturbed normal components representing or approximating in object space the differential surface behavior of the object surface when perturbed by a height field f(u,v). In one example, three perturbed normal components, $Nx'_{OS}$, $Ny'_{OS}$, and $Nz'_{OS}$, of a surface dependent perturbed normal object space texture map N' are calculated from an object space perturbed normal $N'_{OS}$ defined by the following equation:

$$N'_{OS} = ((P_u \times P_v) + D_{OS}) / |(P_u \times P_v) + D_{OS}| \qquad (23)$$

where, $P_u$ and $P_v$ are partial derivatives in object space of the surface position in the u and v parametric directions and a displacement vector $D_{OS}$ in object space is given by:

$$D_{OS} = -f_u(P_v \times N) - f_v(N \times P_v) \qquad (24)$$

where, $f_u$ and $f_v$ are partial derivatives of the image height field in u and v and N is the unperturbed normal vector in object space. Provided that the bump map is fixed to an object surface, the three perturbed normal components can be precomputed for that surface at each point of the height field and stored as a surface dependent texture map.

Preferably, the surface dependent texture map $N'_{OS}$ containing the perturbed object space normal vector is filtered like a simple texture using, for instance, tri-linear mipmap filtering or any other known filtering technique. The texels in the coarser levels of detail can be computed by filtering finer levels of detail and renormalizing, or by filtering the height field and computing the texels from it. Texel components can lie in a range –1 to 1. Such filtering tends to average out the bumps at large minifications, leading to artifacts at silhouette edges. Proper filtering requires computing the reflected radiance over all bumps contributing to a single pixel. This technique is impractical for hardware systems. It should also be noted that, after mipmap filtering, the texture will no longer be normalized, so the surface dependent texture map is preferably normalized prior to lighting, as described further below.

Steps 910 and 920 are preferably performed prior to real-time rendering. In this case, the texture map $N'_{OS}$ is pre-computed and stored in a texture memory, thereby, reducing the number of calculations required during rendering. Perturbed object space normal texture components, $Nx'_{OS}$, $Ny'_{OS}$s, and $Nz'_{OS}$, are fetched from the texture memory during rendering as described below with respect to step 975.

Alternatively, with sufficient processing capability, steps 910 and 920 can be performed "on-the-fly" during rendering of a computer graphics image. Perturbed object space normal texture components $Nx'_{OS}$, $Ny'_{OS}$, $Nz'_{OS}$, calculated and stored on-the-fly, are fetched from texture memory during rendering as described below with respect to step 975.

In step 930, an object space transform matrix O is built. As described above, the matrix O is the inverse of a modelview matrix. The modelview matrix defines a geometric transformation between object space and eye space. Any geometric transformation can be defined including, but not limited to, an object rotation, translation, scaling, warping, projection, and perspective transformation. The modelview matrix can also be generated from any linear combination of one or more matrices in a modelview matrix stack.

In one example, the modelview matrix is a 4×4 matrix, MV, having 16 elements $m_1$ to $m_{16}$ for transforming from four object space coordinates to four eye space coordinates. In this example, four coordinates (x,y,z,w) are used in object space and eye space are used to represent two-dimensional or three-dimensional homogenous vertices. The matrix O is then defined as the inverse of the 4×4 modelview matrix MV, as follows: $O = [MV]^{-1}$. See, e.g., the modelview matrix examples for an OpenGL system described in Chapter 3, pp. 63–116, and Appendix G, pages 475–480 of *OpenGL Programming Guide* incorporated by reference herein.

In step 940, shading vectors, including but not limited to, a lighting vector L and a viewing vector V are transformed by matrix O from shading vectors defined in eye space to shading vectors defined in object space $L_{OS}$, $V_{OS}$. This transformation is preferably carried out at each triangle vertex point p as follows:

$$L_{OS} = O \cdot L \qquad (25)$$

$$V_{OS} = O \cdot V \qquad (26)$$

The transformed lighting and viewing vectors $L_{OS}$, $V_{OS}$ are then interpolated on a per-pixel basis across each triangle (step 950) and normalized (step 960). In step 970, a half angle vector $H_{OS}$ is calculated in object space. Object space half angle vector $H_{OS}$ equals the sum of the normalized object space lighting and viewing vectors $L_{OS}$, $V_{OS}$. The object space half angle vector $H_{OS}$ is then interpolated (step 972) and normalized (step 974) across one or more triangles to increase accuracy.

Figure 10:
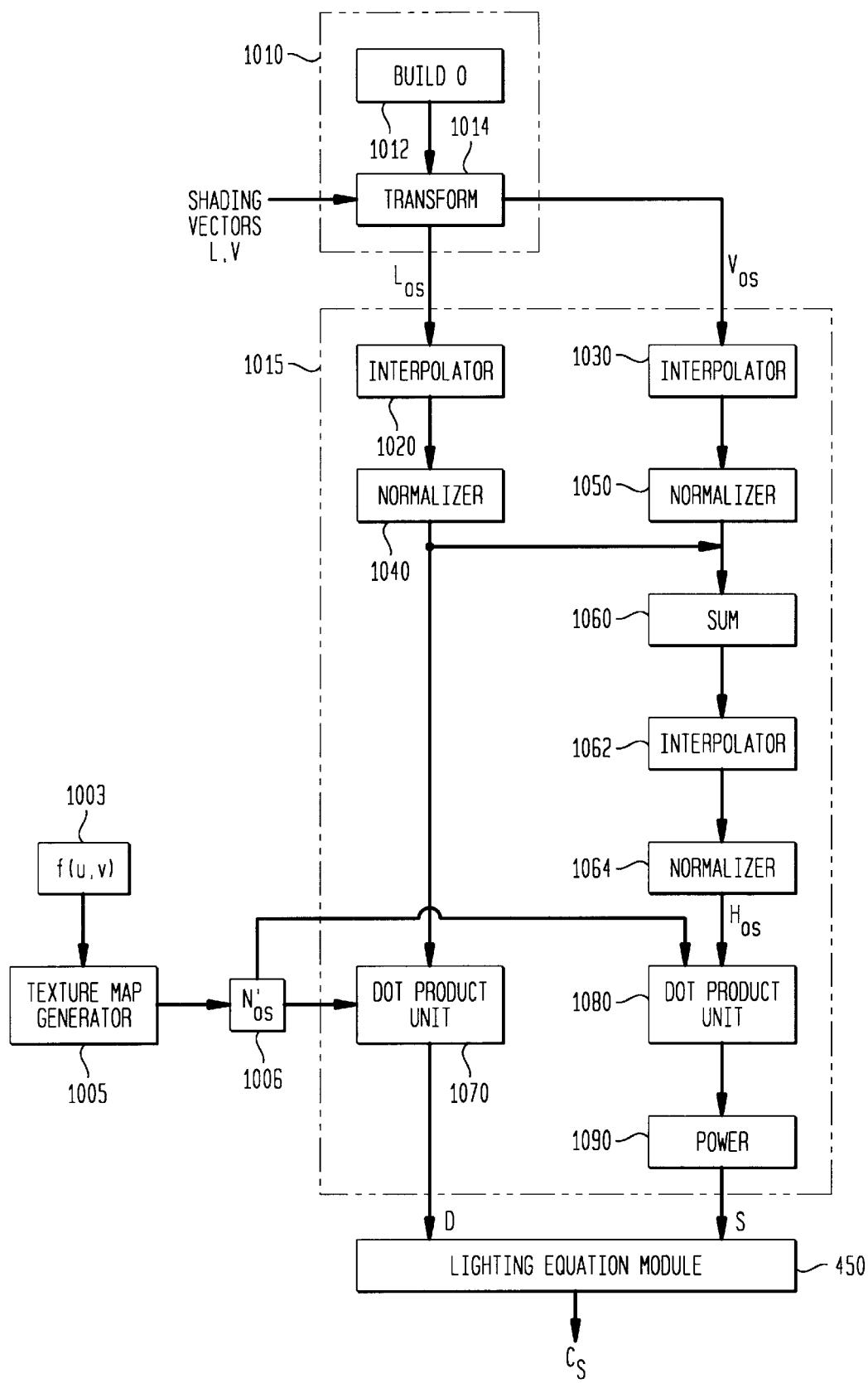
FIG. 10 is a block diagram of a graphics subsystem for bump mapping in object space according to the present invention.

Steps 950 and 972 can perform any type of interpolation across a polygon (e.g. a triangle) including, but not limited to, linear interpolation, barycentric interpolation, and higher-order interpolation (e.g., quadratic and cubic interpolation). Interpolating steps 950 and 972 are optional in that they can be omitted depending upon design needs. Normalizing steps 960 and 974 are also optional in that they can be omitted depending upon design needs. In general, any one, two, or three of the transformed shading vectors $L_{OS}$, $V_{OS}$, and $H_{OS}$ can remain uninterpolated and/or unnormalized if desired. In one alternative example, only the half angle $H_{OS}$ object space shading vector is interpolated and normalized (in other words, steps 950 and 960 (and modules 1020–1050 in FIG. 10 are omitted).

A lighting model is applied using the object space lighting and half angle vectors $L_{OS}$, $H_{OS}$ and perturbed normal texture components, $Nx'_{OS}$, $Ny'_{OS}$, and $Nz'_{OS}$. The perturbed normal texture components, $Nx'_{OS}$, $Ny'_{OS}$, and $Nz'_{OS}$ are fetched from a texture memory (step 975) for use in computing a lighting equation (steps 980 and 990). For example, in step 980 a diffuse component D is calculated for each pixel. The diffuse D component represents the dot product of $N'_{OS}$ and Los as follows:

$$D = Nx'^{OS} \cdot L_{OSx} + Ny'^{OS} \cdot L_{OSy} + Nz'^{OS} \cdot L_{OSz} \quad (27)$$

where $Nx'_{OS}$, $Ny'_{OS}$, and $Nz'_{OS}$ are the three component texture values in the perturbed normal $N'_{OS}$ calculated and stored in step 920 and $L_{OSx}$, $L_{OSy}$, and $L_{OSz}$ are the x, y, and z components respectively of object space lighting vector $L_{OS}$.

A specular component S is similarly calculated for each pixel (step 990). The S component represents the dot product of $N'_{OS}$ and $H_{OS}$ as follows:

$$S = (Nx'_{OS} \cdot H_{OSx} + Ny'_{OS} \cdot H_{OSy} + Nz'_{OS} \cdot H_{OSz})^n \quad (28)$$

where $Nx'_{OS}$, $Ny'_{OS}$, and $Nz'_{OS}$ are the three component texture values in the perturbed normal $N'_{OS}$ texture map calculated in step 920, $H_{OSx}$, $H_{OSy}$, and $H_{OSz}$ are the x, y, and z components respectively of object space half angle vector $H_{OS}$, and n is an integer representing the specular power. The diffuse and specular components can then be used in any lighting equation to determine a color value for a respective pixel. This color value is also called a radiance, lighting, or luminous value. Depending upon the illumination model selected, effects related to lighting an object can be accounted for including but not limited to: material emission representing the object's material, global ambient light scaled by the material's ambient property, and ambient, diffuse, and specular contributions from all light sources properly attenuated. See, for example, the mathematics of lighting described in Beider el al., pp. 182–194 and Foley et al., chap. 16, pp. 721–814 (incorporated above by reference). One example of an entire lighting calculation used to determine final color value $C_S$ for an example illumination model in the present invention is given by the following equation:

$$C_S = E_m + A_m \cdot A_s + \left( \sum_{i=0}^{n-1} A_{tt} \cdot \text{SpotL} \cdot \right. \quad (29)$$

-continued $$\left. S(A_m \cdot A_l + D_m \cdot D_l \cdot (l_z) + S_m \cdot S_l \cdot (H_z)^n) \right) + S_m \cdot \text{Env};$$

wherein, $E_m$ represents emissivity, $A_m$ is a material ambient coefficient, $A_S$ is a scene ambient coefficient, $A_l$ is an ambient light color, $A_{tt}$ is an attenuation factor, SpotL is a spotlight attenuation factor, S is a shadow coefficient, $D_m$ is a diffuse material coefficient, $D_l$ is diffuse light color, $S_m$ is a specular material coefficient, $S_l$ is specular light color, n is the specular power (e.g., shininess), and Env is an environment mapping coefficient. The summation sign sums overall lights n, and like other terms in the lighting equation can be omitted depending upon a particular illumination model.

Bump mapping in object space routine 900 can be implemented primarily as software, firmware, hardware, or any combination thereof in any computer graphics system. Preferably, the bump mapping in object space routine 900 is implemented in a lighting and coloring stage of a graphics engine subsystem. In one example, per-vertex operations can be implemented primarily in software and per-pixel operations can be implemented primarily in hardware.

In particular, bump mapping in object space routine 900 can be implemented, but is not limited to, any graphics processing environment and graphics subsystem architecture as described above with respect to tangent space bump mapping routine 200 (FIGS. 2B, 3, 4A, 4B, and FIG. 8). Further, bump mapping in object space routine 900 can be implemented separately from, or in addition to, tangent space bump mapping routine 200.

FIG. 10 shows a logical architecture for an example lighting and coloring module. A texture map generator 1005 converts a 1-D or 2-D height field 1003 to a three-component texture map $N'_{OS}$ as described above with respect to steps 910–920. The three components of the texels are $Nx'_{OS}$, $Ny'_{OS}$, $Nz'_{OS}$ as defined above. The texture map $N'_{OS}$ is then stored in memory 1006. Preferably, texture map generator 1005 precomputes and stores the texture map $N'_{OS}$ prior to rendering an image. In one embodiment, texture map generator 1005 is implemented primarily in software as a program module that can be executed by a graphics processor or another processor.

Module 1010 transforms shading vectors from eye space into object space. Shading vectors can include, but are not limited to, lighting and viewing vectors L, V. Object space matrix module 1012 builds an object space transform matrix O, as described above with respect to step 930. Transform module 1014 multiplies each shading vector by the matrix O. In this example, eye space lighting and viewing vectors L, V are transformed by matrix O to corresponding object space vectors $L_{OS}$, $V_{OS}$.

Bump mapping module 1015 receives shading vectors in object space and applies bump mapping based on the perturbed normal $N'_{OS}$ stored in memory 1006. In particular, interpolator 1020 interpolates the object space lighting vector $L_{OS}$ across at least one corresponding polygon (e.g. triangle) on a per-pixel basis. Interpolator 1030 interpolates viewing vector $V_{OS}$ across at least one corresponding polygon (e.g. triangle) on a per-pixel basis.

To further improve accuracy, normalizer 1040 normalizes the interpolated object space lighting vector $L_{OS}$. Normalizer 1050 normalizes the interpolated object space viewing vector $V_{OS}$. Sum block 1060 sums the outputs of both normalizers 1050, 1060 to generate an object space half angle vector $H_{OS}$. Interpolator 1062 interpolates the object space half angle vector $H_{OS}$ across at least one corresponding polygon (e.g. triangle). Normalizer 1064 then normalizes the interpolated object space half angle vector $H_{OS}$.

For each pixel, dot product unit 1070 computes a dot product between a corresponding texel value ($Nx'_{OS}$, $Ny'_{OS}$, $Nz'_{OS}$) fetched from memory 1006 and the interpolated, normalized, object space lighting vector $L_{OS}$ output from normalizer 1040. A diffuse component value D is output from dot product unit 1070.

Similarly, dot product unit 1080 computes a dot product between a corresponding texel value ($Nx'_{OS}$, $Ny'_{OS}$s, $Nz'_{OS}$) fetched from memory 1006 and the interpolated, normalized, object space half angle vector $H_{OS}$ output from sum block 1064. Specular power block 1090 raises the output from dot product unit 1080 to a specular power n, where n is an integer (e.g. 2) representing specular power being modeled on the graphics object. For example, specular power block 1090 can use a power look up table as used in OpenGL programming.

As described with respect to steps 950 and 972 above, interpolators 1020, 1030, and 1062 can perform any type of interpolation across a polygon (e.g. a triangle) including, but not limited to, linear interpolation, barycentric interpolation, and higher-order interpolation (e.g., quadratic and cubic interpolation). Interpolators 1020, 1030, and 1062 are optional in that they can be omitted depending upon design needs. Normalizers 1040, 1050, and 1064 are also optional in that they can be omitted depending upon design needs. In general, any combination of zero or more interpolators 1020, 1030, and 1062 and normalizers 1040, 1050, and 1064 can be used. In one alternative example, only the half angle $H_{OS}$ object space shading vector is interpolated and normalized (in other words, modules 1020–1050 are omitted).

Lighting equation block 450 completes lighting and coloring according to a lighting equation used in an illumination model. Block 450 outputs a final color value Cs based on the diffuse D and specular S components output from bump mapping module 1015. For example, block 450 can compute a value Cs as described above with respect to equation (9).

As would be apparent to one skilled in the art given this description, the present invention is not limited to bump mapping shading. In particular, the present invention can be used to shade a computer graphics image by performing a lighting calculation where all lighting vectors are transformed into the same coordinate space as a normal vector (or in the same coordinate space as a perturbed normal vector in the case of bump map shading). This coordinate space can be any mathematical coordinate space, including but not limited to, tangent space, object space, and any variant or transformation (e.g., scaled, linear, affine, or non-linear transformation) of tangent space or object space. The normal vector used for shading (or a perturbed normal vector in the case of bump map shading) can be fetched from any type of memory including, but not limited to, texture memory.

9. Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method for shading a computer graphics image, the computer graphics image including an object surface, comprising the steps of:

building an object space transform matrix that defines a transformation from eye space to object space;

transforming a shading vector defined at a point in eye space into object space defined by said object space transform matrix to form a corresponding object space shading vector;

performing a vector operation between said object space shading vector and a perturbed normal in object space at said point; and computing a shading value for said point based on said vector operation performed in said performing step; whereby, said shading value can be mapped to a pixel to shade the object surface.

2. The method of claim 1, further comprising the step of: storing an object space perturbed normal texture map.

3. The method of claim 2, wherein said storing step stores a surface dependent object space perturbed normal texture map, said surface dependent object space perturbed normal texture map having texels defined by three perturbed normal components $Nx'_{OS}$, $Ny'_{OS}$, and $Nz'_{OS}$, said three perturbed normal components $Nx'_{OS}$, $Ny'_{OS}$, and $Nz'_{OS}$ representing in object space the differential surface behavior of the object surface when perturbed by a height field f(u,v).

4. The method of claim 3, wherein said three perturbed normal components $Nx'_{OS}$, $Ny'_{OS}$, and $Nz'_{OS}$ are components of an object space perturbed normal $N'_{OS}$ defined by the following equation:

$$N'_{OS}=((P_u \times P_v)+D_{OS})/|(P_u \times P_v)+D_{OS}|$$

where, $P_u$ and $P_v$ are partial derivatives in object space of the surface in the u and v parametric directions and a displacement vector $D_{os}$ in object space is given by:

$$D_{OS}=-f_u(P_v \times N)-f_v(N \times P_u)$$

where, $f_u$ and $f_v$ are partial derivatives of said image height field in u and v and N is the unperturbed normal vector in object space.

5. The method of claim 2, wherein said storing step is performed during preprocessing prior to rendering the computer graphics image.

6. The method of claim 2, wherein said storing step is performed on-the-fly during rendering of the computer graphics image.

7. The method of claim 1, wherein said object space transform matrix building step comprises the step of calculating an inverse of a modelview matrix where the modelview matrix defines a transformation from object space to eye space.

8. The method of claim 1, wherein said shading vector includes at least one of a lighting vector, a viewing vector, and a half angle vector and a reflection vector.

9. The method of claim 1, wherein the object surface is represented by triangles, and for each vertex of a triangle, said transforming step transforms a lighting vector and a viewing vector into an object space defined by said object space transform matrix to form corresponding object space lighting and viewing vectors, and further comprising the steps of:

for each pixel, computing a object space half angle vector based on said object space lighting and viewing vectors.

10. The method of claim 9, wherein, said vector operation performing step calculates a first dot product between said object space lighting vector and said perturbed normal in object space for each pixel and a second dot product between said object space half angle vector and said perturbed normal in object space for each pixel, and said shaded value computing step computes said shading value based on a lighting equation having a diffuse component and a specular component raised to a specular power, said diffuse component includes said first dot product and said specular component includes said second dot product.

11. The method of claim 9, further comprising:

for each pixel, prior to computing said object space half angle vector the step of:

interpolating said object space lighting and viewing vectors across at least one corresponding triangle.

12. The method of claim 11, further comprising the step of:

normalizing said object space lighting and viewing vectors after said interpolating step.

13. The method of claim 12, further comprising:

for each pixel, the steps of:

interpolating said object space half angle vector across at least one corresponding triangle; and normalizing said object space half angle after said object space half angle vector interpolating step.

14. The method of claim 9, further comprising:

for each pixel, the step of:

interpolating said object space half angle vector across at least one corresponding triangle.

15. The method of claim 14, further comprising the step of:

normalizing said object space half angle after said object space half angle vector interpolating step.

16. A system for shading a computer graphics image, the computer graphics image including an object surface, the system comprising:

an object space transform module;

a bump mapping module; and a lighting module;

wherein said object space transform module builds an object space transform matrix and transforms a shading vector at said point into object space defined by said object space transform matrix to form a corresponding object space shading vector, said object space shading vector being output to said bump mapping module, and said bump mapping module performs a vector operation between said object space shading vector and a perturbed normal in object space at said point, and provides an output representative of said vector operation, and said lighting module computes a shading value for said point based on said vector operation output; whereby, said shading value can be mapped to a pixel to shade the object surface.

17. The system of claim 16, further comprising a texture memory that stores an object space perturbed normal texture map.

18. The system of claim 17, wherein said object space perturbed normal texture map comprises a surface dependent object space perturbed normal texture map having texels defined by three perturbed normal components representing in object space the differential surface behavior of the object surface when perturbed by a height field f(u,v).

19. The system of claim 18, wherein said three perturbed normal components $Nx'_{OS}$, $Ny'_{OS}$, and $Nz'_{OS}$ are components of an object space perturbed normal $N'_{OS}$ defined by the following equation:

$$N'_{OS} = ((P_u \times P_v) + D_{OS})/|(P_u \times P_v) + D_{OS}|$$

where, $P_u$ and $P_v$ are partial derivatives in object space of the surface in the u and v parametric directions and a displacement vector $D_{OS}$ in object space is given by:

$$D_{OS} = -f_u(P_v \times N) - f_v(N \times P_u)$$

where, $f_u$ and $f_v$ are partial derivatives of said image height field in u and v and N is the unperturbed normal vector in object space.

20. The system of claim 17, further comprising a texture map generator that generates said perturbed texture map and stores said perturbed texture map in said memory during pre-processing prior to rendering the computer graphics image.

21. The system of claim 17, further comprising a texture map generator that generates said perturbed texture map and stores said perturbed texture map in said memory on-the-fly during rendering of the computer graphics image.

22. The system of claim 16, wherein said object space transform module calculates an inverse of a modelview matrix where the modelview matrix defines a transformation from object space to eye space.

23. The system of claim 16, wherein said shading vector includes at least one of a lighting vector, a viewing vector, a half angle vector, and a reflection vector.

24. The system of claim 16, wherein the object surface is represented by triangles, and for each vertex of a triangle, said object space transform module transforms a lighting vector and a viewing vector into an object space defined by said object space transform matrix to form corresponding object space lighting and viewing vectors; and for each pixel, said bump mapping module further computes an object space half angle vector based on said object space lighting and viewing vectors.

25. The system of claim 24, wherein, for each pixel, said bump mapping module calculates a first dot product between said object space lighting vector and said perturbed normal in object space for each pixel and a second dot product between said object space half angle vector and said perturbed normal in object space for each pixel, and said lighting module computes said shading value based on a lighting equation having a diffuse component and a specular component raised to a specular power, said diffuse component includes said first dot product and said specular component includes said second dot product.

26. The system of claim 24, wherein said bump mapping module further comprises:

an interpolator that interpolates said object space lighting and viewing vectors for each pixel across at least one corresponding triangle, and outputs an interpolated object space lighting vector and an interpolated object space viewing vector.

27. The system of claim 26, wherein said bump mapping module further comprises:

a normalizer, coupled to said interpolator, said normalizer normalizes said interpolated object space lighting and viewing vectors.

28. The system of claim 27, wherein said bump mapping module further comprises:

an interpolator that interpolates said object space half angle vector for each pixel across at least one corresponding triangle, and outputs an interpolated object space half angle vector.

29. The system of claim 24, wherein said bump mapping module further comprises:
an interpolator that interpolates said object space half angle vector for each pixel across at least one corresponding triangle, and outputs an interpolated object space half angle vector.

30. The system of claim 29, wherein said bump mapping module further comprises:
a normalizer that normalizes said interpolated object space half angle vector.

31. A system for shading an object surface, the system comprising:
means for building an object space transform matrix that defines a transformation from eye space to object space;
means for transforming a shading vector defined at a point in eye space into object space defined by said object space transform matrix to form a corresponding object space shading vector;
means for performing a vector operation between said object space shading vector and a perturbed normal in object space at said point; and
means for computing a shading value for said point based on said vector operation; whereby, said shading value can be mapped to a pixel to shade the object surface when rendered on a computer graphics display.

32. A computer program product comprising a computer useable medium having computer program logic recorded thereon for enabling a graphics processor in a computer system to shade an object surface in a computer graphic image, said computer program logic comprising:
means for enabling the graphics processor to build an object space transform matrix that defines a transformation from eye space to object space;
means for enabling the graphics processor to transform a shading vector defined at a point in eye space into object space defined by said object space transform matrix to form a corresponding object space shading vector;
means for enabling the graphics processor to perform a vector operation between said object space shading vector and a perturbed normal in object space at said point; and
means for enabling the graphics processor to compute a shading value for said point based on said vector operation; whereby, said shading value can be mapped to a pixel to shade the object surface when rendered on a computer graphics display.

33. A system for shading a computer graphics image, comprising:
Phong shading hardware;
a texture memory for storing an object space perturbed normal texture map; and
a switch coupled between said Phong shading hardware and said texture memory;
whereby, object space bump mapping can shade the computer graphics image when said switch is in a state connecting said texture memory to said Phong shading hardware.

34. The system of claim 33, wherein said switch couples said texture memory to a normalizer unit in said Phong shading hardware.

35. The system of claim 33, wherein said switch comprises a multiplexer.

36. A method for shading a computer graphics image, the computer graphics image including an object surface, comprising the steps of:

fetching a normal vector for the object surface from memory, said normal vector being defined in terms of a coordinate space;
transforming a shading vector into said coordinate space; and
performing a lighting computation in said coordinate space using said normal vector and said transformed shading vector.

37. A system for shading a computer graphics image, the computer graphics image including an object surface, comprising:
means for fetching a normal vector for the object surface from memory, said normal vector being defined in terms of a coordinate space;
means for transforming a shading vector into said coordinate space; and
means for performing a lighting computation in said coordinate space using said normal vector and said transformed shading vector.

38. A computer program product comprising a computer useable medium having computer program logic recorded thereon for enabling a graphics processor in a computer system to shade an object surface in a computer graphic image, said computer program logic comprising:
means for enabling the graphics processor to fetch a normal vector for the object surface from memory, said normal vector being defined in terms of a coordinate space;
means for enabling the graphics processor to transform a shading vector into said coordinate space; and
means for enabling the graphics processor to perform a lighting computation in said coordinate space using said normal vector and said transformed shading vector.

39. A method for shading a computer graphics image, the computer graphics image including an object surface, comprising the steps of:
fetching a perturbed normal vector for the object surface from memory, said perturbed normal vector being defined in terms of a coordinate space;
transforming a shading vector into said coordinate space; and
performing a lighting computation in said coordinate space using said perturbed normal vector and said transformed shading vector.

40. A system for shading a computer graphics image, the computer graphics image including an object surface, comprising:
means for fetching a perturbed normal vector for the object surface from memory, said perturbed normal vector being defined in terms of a coordinate space;
means for transforming a shading vector into said coordinate space; and
means for performing a lighting computation in said coordinate space using said perturbed normal vector and said transformed shading vector.

41. A computer program product comprising a computer useable medium having computer program logic recorded thereon for enabling a graphics processor in a computer system to shade an object surface in a computer graphic image, said computer program logic comprising:
means for enabling the graphics processor to fetch a perturbed normal vector for the object surface from memory, said perturbed normal vector being defined in terms of a coordinate space;

means for enabling the graphics processor to transform a shading vector into said coordinate space; and means for enabling the graphics processor to perform a lighting computation in said coordinate space using said perturbed normal vector and said transformed shading vector.

* * * * *

UNITED STATES PATENT AND TRADEMARK OFFICE
CERTIFICATE OF CORRECTION

PATENT NO. : 5,880,736
DATED : March 9, 1999
INVENTOR(S) : Peercy et al.

It is certified that error appears in the above-identified patent and that said Letters Patent is hereby corrected as shown below:

On cover page, item [54] please replace the title with --Method, System, and Computer Program Product For Shading--;

In Column 1, Lines 1-2, please replace the title with --Method, System, and Computer Program Product For Shading--;

On cover page, item [56] under U.S. PATENT DOCUMENTS, please insert the following patents:

| Number | Date | Inventor(s) | Class/Subclass |
|---|---|---|---|
| 5,710,876 | 01/1998 | Peercy *et al.* | 345/426 |
| 5,734,385 | 03/1998 | Mima | 345/426 |

Signed and Sealed this
First Day of February, 2000

Attest:

Q. TODD DICKINSON

*Attesting Officer*  *Acting Commissioner of Patents and Trademarks*